(12) United States Patent
Suzuki

(10) Patent No.: US 7,031,093 B2
(45) Date of Patent: Apr. 18, 2006

(54) STORAGE MEDIUM AND METHOD FOR ACTUATOR MOVEMENT CONTROL

(75) Inventor: Nobuyuki Suzuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/824,172

(22) Filed: Apr. 14, 2004

(65) Prior Publication Data

US 2005/0105205 A1    May 19, 2005

(30) Foreign Application Priority Data

Nov. 18, 2003   (JP) .............................. 2003-388146

(51) Int. Cl.
*G11B 21/02*    (2006.01)

(52) U.S. Cl. ...................................... 360/75

(58) Field of Classification Search ................... 360/75
See application file for complete search history.

(56) References Cited

U.S. PATENT DOCUMENTS

| 4,956,831 A | * | 9/1990 | Sarraf et al. | ............. | 360/78.04 |
| 2001/0036031 A1 | * | 11/2001 | Hirano et al. | ................. | 360/75 |

FOREIGN PATENT DOCUMENTS

| JP | 9-320222 | 12/1997 |
| JP | 2001-052458 | 2/2001 |
| JP | 2001-155455 | 6/2001 |
| JP | 2003-085902 | 3/2003 |
| JP | 2003-141839 | 5/2003 |
| JP | 2003-196939 | 7/2003 |

* cited by examiner

*Primary Examiner*—David Hudspeth
*Assistant Examiner*—Mitchell Slavitt
(74) *Attorney, Agent, or Firm*—Greer, Burns & Crain, Ltd.

(57) ABSTRACT

A storage device employing the ramp load/unload technique for an actuator is disclosed that has high shock-resistance, high vibration-resistance, and is capable of rapid and stable ramp load/unload operations. A position detection unit integrates the speed of the actuator, obtained by detecting a back electromotive force generated in a VCM, to calculate the present position of the magnetic head. A position determination unit compares the present position of the magnetic head with a series of position thresholds, and based on the comparison results, a bandwidth switching unit switches the bandwidth of a PI controller for feedback control of the actuator, from a narrow bandwidth to a wide bandwidth and vice versa. At positions where the speed starts to change or the speed change becomes small, the position determination is performed and the bandwidth is appropriately switched.

18 Claims, 23 Drawing Sheets

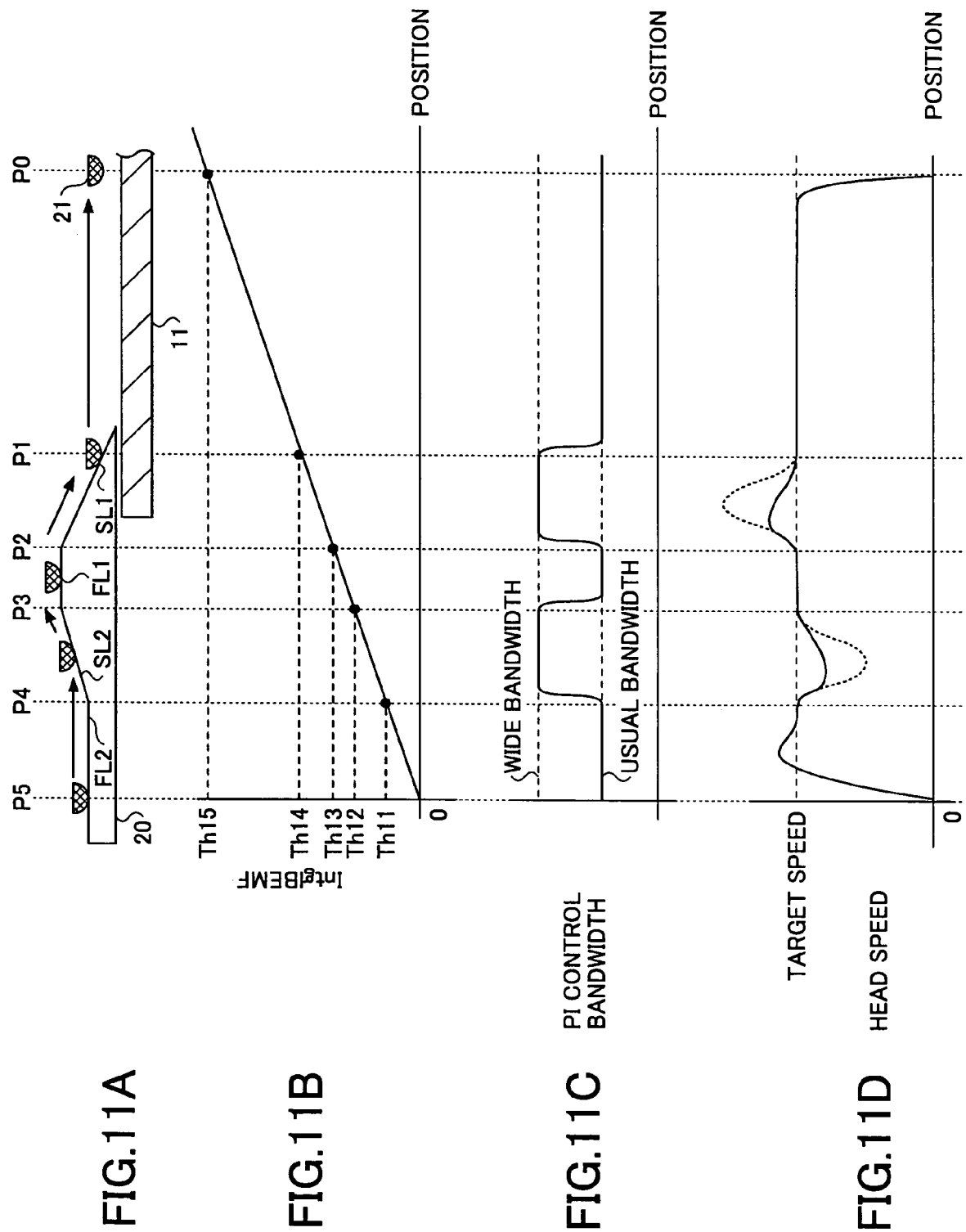

FIG.14A

| TIME | FF CONTROL VARIABLE |
|------|---------------------|
| 0    | −1                  |
| 1    | −3                  |
| 2    | −6                  |
| :    | :                   |
| m−2  | −6                  |
| m−1  | −3                  |
| m    | −1                  |

FIG.14B

| TIME | FF CONTROL VARIABLE |
|------|---------------------|
| 0    | 1                   |
| 1    | 3                   |
| 2    | 6                   |
| :    | :                   |
| n−2  | 6                   |
| n−1  | 3                   |
| n    | 1                   |

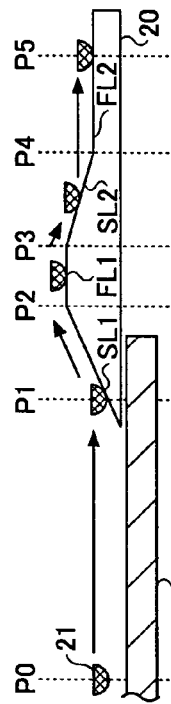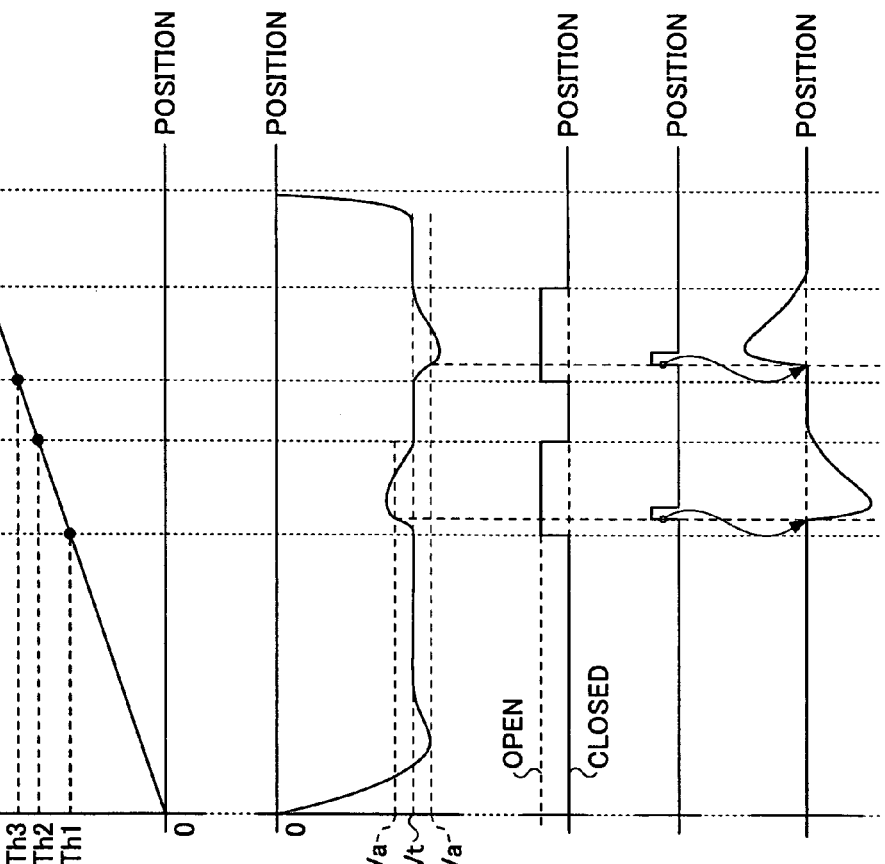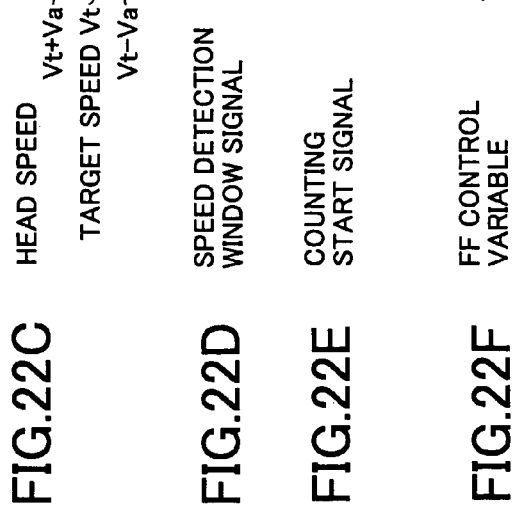
FIG.22A
FIG.22B
FIG.22C
FIG.22D
FIG.22E
FIG.22F

STORAGE MEDIUM AND METHOD FOR ACTUATOR MOVEMENT CONTROL

BACKGROUND OF THE INVENTION

1. Field of the Invention

The present invention relates to a storage medium including an actuator employing a ramp loading/unloading technique, and a method of controlling movement of the actuator.

2. Description of the Related Art

In the recent years and continuing, technologies have been developed at an accelerating rate to increase recording density of storage media, such as hard disks, and the recording density per area is increasing by 100% annually. One subject in this development is to improve reproduction performance.

In a hard disk, a magnetic head records or reproduces data in a magnetic disk while floating over the surface of the magnetic disk at a certain height. The amount of space between the magnetic head and the magnetic disk is called "floating height", or "flying height", or "head gap". It is known that the reproduction performance improves when the floating height decreases, and as the state of the art of the technology, a floating height as small as 10 nm has been achieved. To achieve such a small floating height, the surfaces of the magnetic head and the magnetic disk have to be made smooth.

In the related art, the magnetic head is operated in a CSS (Contact Start Stop) mode, in which the magnetic head comes to rest on the surface of the magnetic disk when the drive is not in operation, and the surface of the magnetic disk has to be textured (roughened) to prevent adhesion of the magnetic head to the surface of the magnetic disk to prevent impact on rotation of the magnetic disk.

However, as mentioned above, to achieve a smaller floating height, the surfaces of the magnetic head and the magnetic disk have to be made smooth to improve surface perfection, and due to this, adhesion of the magnetic head to the surface of the magnetic disk becomes remarkable.

One of the solutions to this problem is the so-called ramp load/unload technique, in which the magnetic head is moved away from the surface of the magnetic disk to be laid on a ramp when the disk is not rotating.

With the ramp load/unload technique, surfaces of the magnetic head and the magnetic disk can be made smooth. Further, because the magnetic head and the magnetic disk are not in contact when the drive is not in operation, resistance against shock of the drive is highly improved. For example, even when one moves around while carrying a personal computer, shock to the computer can be suppressed, and trouble can be reduced. Because of these benefits, the use of the ramp load/unload technique is wide-spread.

FIG. 1 is view for schematically explaining the ramp load/unload technique.

In the ramp load/unload technique, as shown in FIG. 1, when unloading a magnetic head 100, the following operations are performed.

As shown in FIG. 1, an actuator 102 supports the magnetic head 100 floating over a magnetic disk 101 in operation. First, the actuator 102, which is at a position A, moves in the right direction in FIG. 1. When the actuator 102 moves to a position B, a lift tab 103 formed in the actuator 102 comes in contact with a ramp 104 located near the magnetic disk 101, and the actuator 102 is lifted up along the slope of the ramp 104. When the actuator 102 moves further in the right direction to a position C, the magnetic head 100 is moved beyond the outer diameter of the magnetic disk 101.

At the position C, because the magnetic head 100 and the magnetic disk 101 are not in contact, even when a shock or any outer force is imposed on the magnetic head 100, contact of the magnetic head 100 with the magnetic disk 101 can be avoided.

When loading the magnetic head 100, the above operations are performed in the reversed order. That is, the actuator 102 moves from the position C to the position B and finally the position A. Because of an air bearing formed between the magnetic head 100 and the magnetic disk 101, the magnetic head 100 can stably float over the magnetic disk 101.

When the magnetic head 100 is raised (unloading operation) with the air bearing existing between the magnetic head 100 and the magnetic disk 101, or when the magnetic head 100 is lowered down to the magnetic disk 101 (loading operation) with the air bearing to be formed, while the ramp 104 raises the lift tab 103 upward, the actuator 102, which holds the lift tab 103, is engaged with a springy suspension and tends to move downward. Therefore, for example, in the unloading operation, if the upward speed of the magnetic head 100 is not sufficiently high, the magnetic head 100 may be pulled down to contact the surface of the magnetic disk 101. Similarly, in the loading operation, if the downward speed of the magnetic head is too high, the same problem may occur.

To solve this problem, it is proposed to control the moving speed of the actuator to be in an appropriate region so that the vertical speed of the magnetic head 100 relative to the magnetic disk 101 is in an appropriate range, thereby, preventing contact of the magnetic head 100 with the surface of the magnetic disk 101.

Specifically, the vertical speed of the actuator 102 is determined by the shape of the ramp 104, and the horizontal speed of the actuator 102 is related to a voice coil motor (VCM) that drives the actuator 102.

FIG. 2 is a graph showing variation of the speed of the actuator 102 in feedback control in the related art, in which the bandwidth of the feedback control is fixed.

In FIG. 2, in the unloading direction, (the right direction), the speed of the actuator 102 is expressed by a negative value. For example, an increase of the speed of the actuator 102 in the unloading operation corresponds to an increase of the graph in the downward direction in FIG. 2.

When the lift tab 103 comes into contact with the ramp 104 at the position B, the moving speed of the actuator 102 drops notably, as shown by the solid line in FIG. 2. Accordingly, the vertical speed of the magnetic head 100 decreases remarkably, and the magnetic head 100 may contact the surface of the magnetic disk 101.

As a solution to this problem, it is proposed to detect the decrease of the speed of the lift tab 103 when the lift tab 103 comes into contact with the ramp 104, or detect an increase of a control variable in control of the voice coil motor, and increase a gain of the feedback control or add a feed-forward control variable according the detection results. Thereby, the speed decrease can be suppressed.

For example, Japanese Laid-Open Patent Application No. 2001-052458 discloses such a technique.

In this technique, as shown in FIG. 2, a threshold value of speed is used for detecting the speed decrease, and it is required that the threshold of speed be set sufficiently far away from a target speed so as not to make unnecessary response to even a small speed change caused by external shock or vibration. With such a threshold, however, the detection time Δt increases. Here, the detection time Δt is defined to be the time period from the time when the lift tab 103 comes into contact with the ramp 104 to the time when the contact is detected by detecting the decrease of the moving speed. During the detection time Δt, measures cannot be taken to compensate the decrease of the speed, and thus it is difficult to suppress the speed drop, as shown by the solid line in FIG. 2.

On the other hand, for convenience of usage, it is required that the loading and unloading operations of the magnetic head 100 be completed in a short time. Hence, it is necessary to shorten the detection time and increase the moving speed of the actuator.

However, if the threshold value of the moving speed is set close to the target value so as to shorten the detection time Δt, detection errors may occur, and this may cause unintended large changes of the speed.

If the gain in the feedback control is set higher, oscillation may be induced easily, and this may degrade the stability of speed control. For example, when the device is being carried or used in a vibratory environment, such as in a train, operational stability of the device cannot be secured.

SUMMARY OF THE INVENTION

It is a general object of the present invention to solve one or more of the problems of the related art.

It is a more specific object of the present invention to provide a storage device having high shock-resistance and vibration-resistance and capable of fast and stable loading/unloading operations, and a method of controlling movement of an actuator.

According to a first aspect of the present invention, there is provided a storage device, comprising a disk medium; a recording and reproducing head that floats over the disk medium and records information in the disk medium or reproduces information in the disk medium; an actuator that supports the recording and reproducing head and moves the recording and reproducing head in a radial direction of the disk medium; a driving unit that drives the actuator; a speed detection unit that detects a moving speed of the actuator; a speed control unit that controls the moving speed of the actuator by a feedback control based on a difference between the detected moving speed of the actuator and a target speed; a ramp member arranged outside the disk medium used for loading and unloading the recording and reproducing head; a position detection unit that detects a position of the recording and reproducing head; and a position determination unit that determines whether the detected position of the recording and reproducing head reaches a first predetermined position in operations of loading or unloading the recording and reproducing head. The speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination.

In an embodiment, the first predetermined position may be a position where the recording and reproduction head is nearly in contact with the ramp member in the operation of unloading the recording and reproducing head.

According to the present invention, in operations of loading or unloading a recording and reproducing head, a position determination unit determines whether the recording and reproducing head detected by the position detection unit reaches a first predetermined position, and based on the position determination, a bandwidth switching unit switches the bandwidth of a feedback control to a wide bandwidth, or a feed-forward compensation unit adds a predetermined feed-forward control variable to a control variable of the feed-back control.

Accordingly, when it is detected that the recording and reproducing head is at the first predetermined position, for example, the position where the actuator comes into contact with the ramp member in the unloading operation, or the position where the actuator starts to ascend the ramp member in the loading operation, a control variable can be quickly changed before or during a speed change of the actuator, for example, a rapid drop of the speed.

In addition, the bandwidth of the feedback control is switched to a wide bandwidth, or a feed-forward control variable is added to the feed-back control variable based on the position of the recording and reproducing head, thereby, the device is not influenced by external shock or vibration, and even at positions where the speed change of the actuator is small, operational errors do not occur. Consequently, it is possible to achieve highly stable loading and unloading operations.

In an embodiment, if the position determination unit determines that the position of the recording and reproducing head reaches the first predetermined position, the bandwidth switching unit may switch the bandwidth of the feedback control to the wide bandwidth, or the feed-forward compensation unit may add the predetermined feed-forward control variable to the control variable of the feed-back control.

According to the present invention, because the bandwidth of the feedback control is switched to the wide bandwidth, or the predetermined feed-forward control variable is added to the feed-back control variable directly based on the result of the position determination, the control of movement of the actuator can be simplified, and can be performed quickly and easily.

In an embodiment, the storage device may further comprise a speed change determination unit that determines whether the speed difference is greater than a predetermined value when the position determination unit determines that the position of the recording and reproducing head reaches the first predetermined position. If the speed change determination unit determines that the speed difference is greater than the predetermined value, the bandwidth switching unit may switch the bandwidth of the feedback control to the wide bandwidth, or the feed-forward compensation unit may add the predetermined feed-forward control variable to the control variable of the feed-back control.

According to the present invention, because the speed change determination of the actuator is performed only when the position of the recording and reproducing head reaches the first predetermined position, and the bandwidth of the feedback control is switched to the wide bandwidth, or the predetermined feed-forward control variable is added to the feed-back control variable according to the determination result, the detection sensitivity of speed change determination is high, and for example, the threshold value of speed deviation from the target speed can be set small.

In addition, because the speed change determination is not performed at usual positions where the speed change of the actuator is small, at these positions operational errors due to influence from external shock or vibration do not happen. As a result, the control operation is stable.

In an embodiment, the ramp member may include a slope portion having a surface inclined relative to a surface of the disk medium, said slope portion raising the recording and reproducing head away from the disk medium in the operation of unloading the recording and reproducing head; and a flat portion parallel to the surface of the disk medium and connecting with the slope portion. In the operation of loading the recording and reproducing head, the first predetermined position includes a position at a boundary of the slope portion and the flat portion.

In an embodiment, the position detection unit may detect the position of the recording and reproducing head by calculating a distance from a reference position to the position of the recording and reproducing head. Specifically, the position detection unit may calculate the distance by integrating the moving speed of the actuator detected by the speed detection unit.

Alternatively, the storage device may further comprise a position displaying unit that displays the position of the actuator. The position detection unit may calculate the distance by using the position of the actuator displayed in the position displaying unit. For example, the position displaying unit may include one of a rotary encoder mounted on the actuator and an optical scale mounted on the actuator.

In an embodiment, the reference position may include a position where the actuator is mechanically limited and mechanically stopped. Alternatively, the disk medium may be a magnetic disk medium; and the reference position may include a predetermined cylinder position based on servo information recorded in the magnetic disk medium. For example, the predetermined cylinder position may be a position of a cylinder at the periphery of the magnetic disk medium. Furthermore, the cylinder at the periphery of the magnetic disk medium may be the outermost cylinder of the magnetic disk medium.

In an embodiment, a second predetermined position may be provided. When the position determination unit determines that the position of the recording and reproducing head reaches the second predetermined position, the bandwidth switching unit may switch the bandwidth of the feedback control to a narrow bandwidth, or the feed-forward compensation unit may stop adding the predetermined feed-forward control variable to the control variable of the feed-back control.

In an embodiment, in the operation of unloading the recording and reproducing head, the second predetermined position may be a position at a boundary of the slope portion and the flat portion; and in the operation of loading the recording and reproducing head, the second predetermined position may be a position where the recording and reproducing head is substantially out of contact with the slope portion.

According to a second aspect of the present invention, there is provided a method of controlling movement of an actuator that supports a recording and reproducing head floating over a disk medium and recording or reproducing information in the disk medium, moves the recording and reproducing head in an in-plane direction of the disk medium, and loads or unloads the recording and reproducing head by using a ramp member arranged outside the disk medium. The method comprises the steps of detecting a moving speed of the actuator; controlling the moving speed of the actuator by a feedback control based on a difference between the detected moving speed and a target speed; detecting a position of the recording and reproducing head in operations of loading or unloading the recording and reproducing head; determining whether the detected position of the recording and reproducing head reaches a predetermined position; and switching a bandwidth of the feedback control to a wide bandwidth or adding a predetermined feed-forward control variable to a control variable of the feed-back control based on the result of the position determination.

According to the present invention, in operations of loading or unloading the recording and reproducing head, the position of the recording and reproducing head is detected, and it is determined whether the position of the recording and reproducing head reaches a first predetermined position, and based on the result of the position determination, the bandwidth of the feedback control is switched to a wide bandwidth, or a predetermined feed-forward control variable is added to the feed-back control variable. As a result, it is possible to quickly and stably control the speed of the actuator.

In an embodiment, the step of switching may be executed when it is determined that the detected position of the recording and reproducing head reaches the predetermined position in the step of determining.

In an embodiment, after the step of determining and before the step of switching, the method may further comprise a step of determining whether the speed difference is greater than a predetermined value when it is determined that the position of the recording and reproducing head reaches the predetermined position. The step of switching may be executed when it is determined that the speed difference is greater than the predetermined value.

These and other objects, features, and advantages of the present invention will become more apparent from the following detailed description of the preferred embodiments given with reference to the accompanying drawings.

BRIEF DESCRIPTION OF THE DRAWINGS

FIG. 11A is a cross-sectional view of the portion of the magnetic disk device 10 along the line indicated by the arrows X in FIG. 5, schematically showing a sequence of positions of the lift tab 21 in the operation of loading the magnetic head 12 according to the first embodiment;

FIG. 11B is a graph showing correspondence of the integration of the BEMF (IntglBEMF) and the position thresholds Th1 through Th5 with the position of the lift tab 21 in the operation of loading the magnetic head 12 according to the first embodiment;

FIG. 11C is a graph showing the bandwidth of the PI control set based on the position of the lift tab 21 in the operation of loading the magnetic head 12 according to the first embodiment;

FIG. 11D is a graph showing the speed of the magnetic head 12 changing with the position of the lift tab 21 in the operation of loading the magnetic head 12 according to the first embodiment;

FIG. 14A and FIG. 14B show tables containing data of the feed-forward control variable used in the operation of unloading the magnetic head 12 according to the third embodiment, where, FIG. 14A shows a first table containing data used when the lift tab 21 comes into contact with the ramp 20 and ascends the slope SL1 of the ramp 20, and FIG. 14B shows a second table containing data used when the lift tab 21 ascends the slope SL2 of the ramp 20;

FIG. 22A is a cross-sectional view of the portion of the magnetic disk device 10 schematically showing a sequence of positions of the lift tab 21 in the operation of unloading the magnetic head 12 according to the fifth embodiment;

FIG. 22B is a graph showing the integration of the BEMF (IntglBEMF) and the position thresholds Th1 through Th4, which correspond to specified positions of the lift tab 21 in the operation of unloading the magnetic head 12 according to the fifth embodiment;

FIG. 22C is a graph showing the speed of the magnetic head 12, which changes with the position of the lift tab 21 in the operation of unloading the magnetic head 12 according to the fifth embodiment;

FIG. 22D is a graph showing the speed detection window signal in the operation of unloading the magnetic head 12 according to the fifth embodiment;

FIG. 22E is a graph showing the counting start signal in the operation of unloading the magnetic head 12 according to the fifth embodiment;

FIG. 22F is a graph showing the feed-forward control variable, which changes with the position of the lift tab 21 in the operation of unloading the magnetic head 12 according to the fifth embodiment.

DESCRIPTION OF THE PREFERRED EMBODIMENTS

Below, preferred embodiments of the present invention are explained with reference to the accompanying drawings.
First Embodiment FIG. 3 is a plan view of a magnetic disk device 10 related to a first embodiment according to the present invention.

Figure 3:
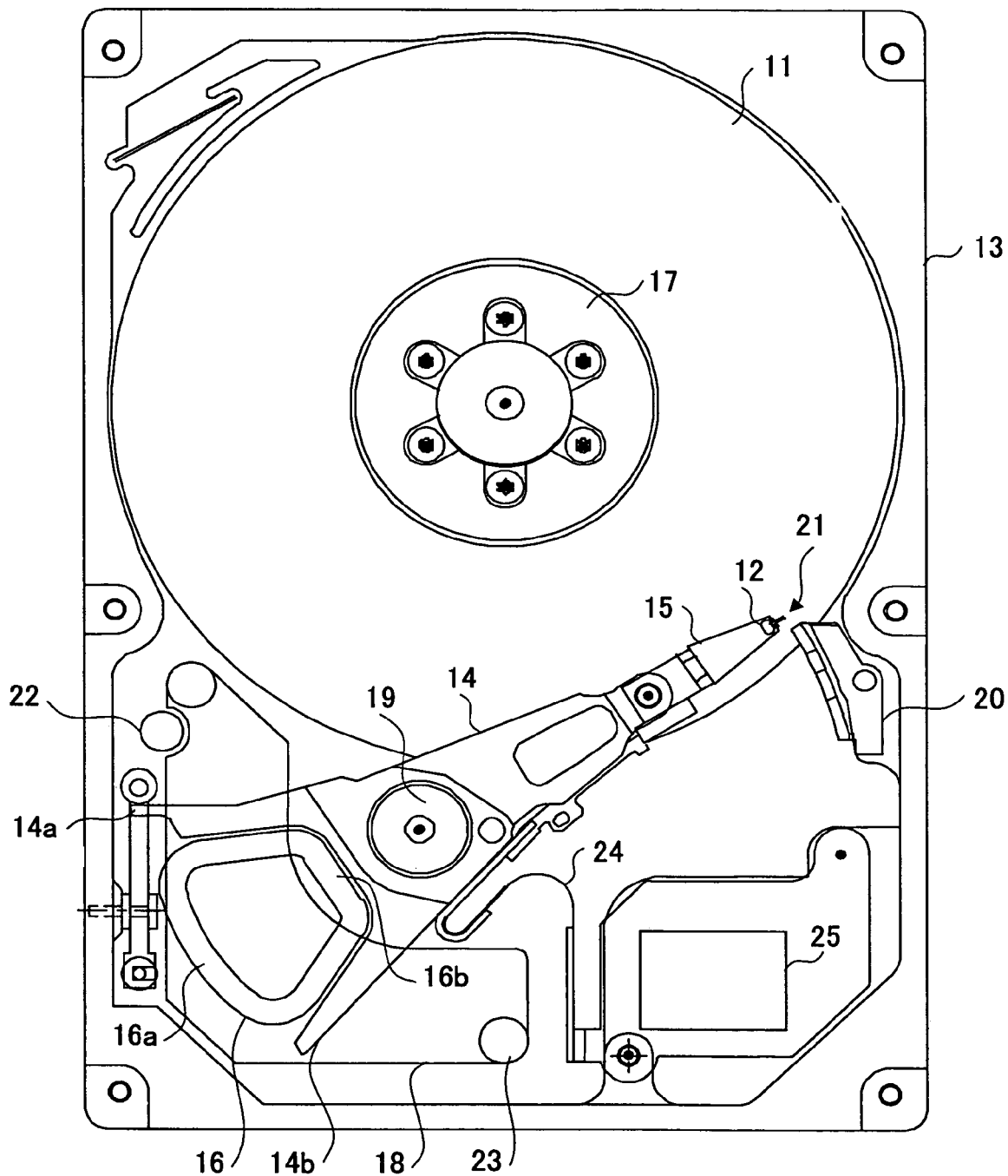
FIG. 3 is a plan view of a magnetic disk device 10 related to a first embodiment according to the present invention.

As shown in FIG. 3, the magnetic disk device 10 includes a magnetic disk 11, a magnetic head 12 for recording or reproducing information in the magnetic disk 11, and a disk enclosure 13 for accommodating the magnetic disk 11 and the magnetic head 12.

Furthermore, the magnetic disk device 10 includes an actuator 14 supporting and moving the magnetic head 12, a suspension 15 attached to the end of the actuator 14, a voice coil motor (VCM) 16 joined to the base portions 14a and 14b of the actuator 14, a pair of permanent magnets 18 arranged above and below the voice coil motor 16, a ramp 20 arranged close to the outer side of the magnetic disk 11 for unloading the magnetic head 12, a lift tab 21 attached to the end of the suspension 15 to raise the magnetic head 12 perpendicularly when the lift tab 21 moves on the ramp 20, an outer stopper 22 and an inner stopper 23 to limit the movement range of the magnetic head 12, a flexible printed circuit board (FPC) 24, and a pre-amplifier 25.

The magnetic disk 11 has a disk substrate formed from strengthened glass or others, and a stacked structure on the substrate, including a magnetic layer in which information is sustained as directions of magnetization, a protection layer formed on the magnetic layer to protect against mechanical damage to or oxidation of the magnetic layer, and a lubrication layer formed on the protection layer. The magnetization of the magnetic layer 11 may be parallel to the substrate, that is, the information is recorded by means of in-plane magnetic recording, or the magnetization of the magnetic layer 11 may also be perpendicular to the substrate, that is, the information is recorded by means of perpendicular magnetic recording. The magnetic layer 11 may be formed from well known ferromagnetic materials, for example, CoCrPt-based alloys, such as CoCrPtB.

The magnetic disk 11 is driven to rotate by a spindle motor 26 (SPM) (illustrated in FIG. 4) fixed by a hub 17.

The magnetic disk device 10 may include only one magnetic disk 11, or a number of magnetic disks 11, and these magnetic disks 11 may be stacked but separated from each other.

In the magnetic disk 11, servo information (not illustrated) is recorded for the magnetic head 12 to track relative to cylinders (not illustrated). The magnetic head 12 tracks while reading the servo information, thereby reading data recorded in cylinders.

The magnetic head 12 is arranged to face the magnetic disk 11, and is supported by the suspension 15 connected to the end of the actuator 14. In the magnetic head 12, a recording/reproduction unit is installed, for example, the recording and reproducing unit includes an inductive write element for recording and a magneto-resistive element for reproduction.

The inductive write element may be a ring-shaped element in the case of in-plane magnetic recording, and may be a single-pole element in the case of perpendicular magnetic recording. The magneto-resistive element may be, for example, a spin-valve Giant Magneto-Resistive (GMR) element, or a Tunneling Magneto-Resistive (TMR) element, or a Ballistic Magneto-Resistive (BMR) element.

Each magnetic head 12 is installed to track one surface of a magnetic disk 11. But not all of the magnetic disks 11 have a magnetic head 12 installed on each of their surfaces.

The actuator 14 is installed to support the magnetic head 12 and move the magnetic head 12 on the magnetic disk 11. The voice coil motor (VCM) 16 is joined to the base of the actuator 14. Due to the interaction with the magnetic fields from the permanent magnets 18, which are applied on the voice coil motor 16, the actuator 14 rotates in an arc relative to a rotational axis 19 so as to change radial positions on the magnetic disk 11 while being parallel to the magnetic disk 11. Below, this arc-induced direction of movement by the actuator 14 relative to the magnetic disk 11 is referred to as "in-plane direction".

The suspension 15, formed from, for example, an SUS sheet, is attached to the end of the actuator 14.

The lift tab 21 is attached to the end of the suspension 15 to raise the magnetic head 12 in a direction perpendicular to the surface of the magnetic disk 11 when the lift tab 21 moves on the ramp 20. Below, the direction perpendicular to the surface of the magnetic disk 11 is referred to as "perpendicular direction".

In FIG. 3, one end of the lift tab 21 is fixed at the center of one end of the suspension 15, and the other end of the lift tab 21 is outside the suspension 15 along the long side of the suspension 15. But the lift tab 21 may be mounted in other ways. For example, the lift tab 21 may be fixed to the end portion of the suspension 15.

The ramp 20 is arranged close to the outer side of the magnetic disk 11, and is placed on a circle through which the lift tab 21 passes. The ramp 20 superposes a vertical motion on the in-plane motion of the actuator 14.

The outer stopper 22 and the inner stopper 23 are arranged in the area where the base portions 14a and 14b, respectively, of the actuator 14 move in arcs so as to limit the range in which the magnetic head 12 moves. When either of the base portions 14a or 14b comes in contact with the outer stopper 22 or the inner stopper 23, respectively, the actuator 14 comes to rest.

Recording signals and reproduction signals for driving the magnetic head 12 are supplied from an IC of a hard disk controller (HDC), arranged on an electric board (not illustrated) placed below a housing of the magnetic disk device 10, through the pre-amplifier 25, the magnetic head 12, and the flexible printed circuit board (FPC) 24.

A driver IC for controlling and driving the spindle motor and the voice coil motor 16 are also placed on the electric board. An upper lid (not-illustrated) is used to close the enclosure 13 so as to prevent entrance of dust and other foreign matter from the atmosphere.

Figure 4:
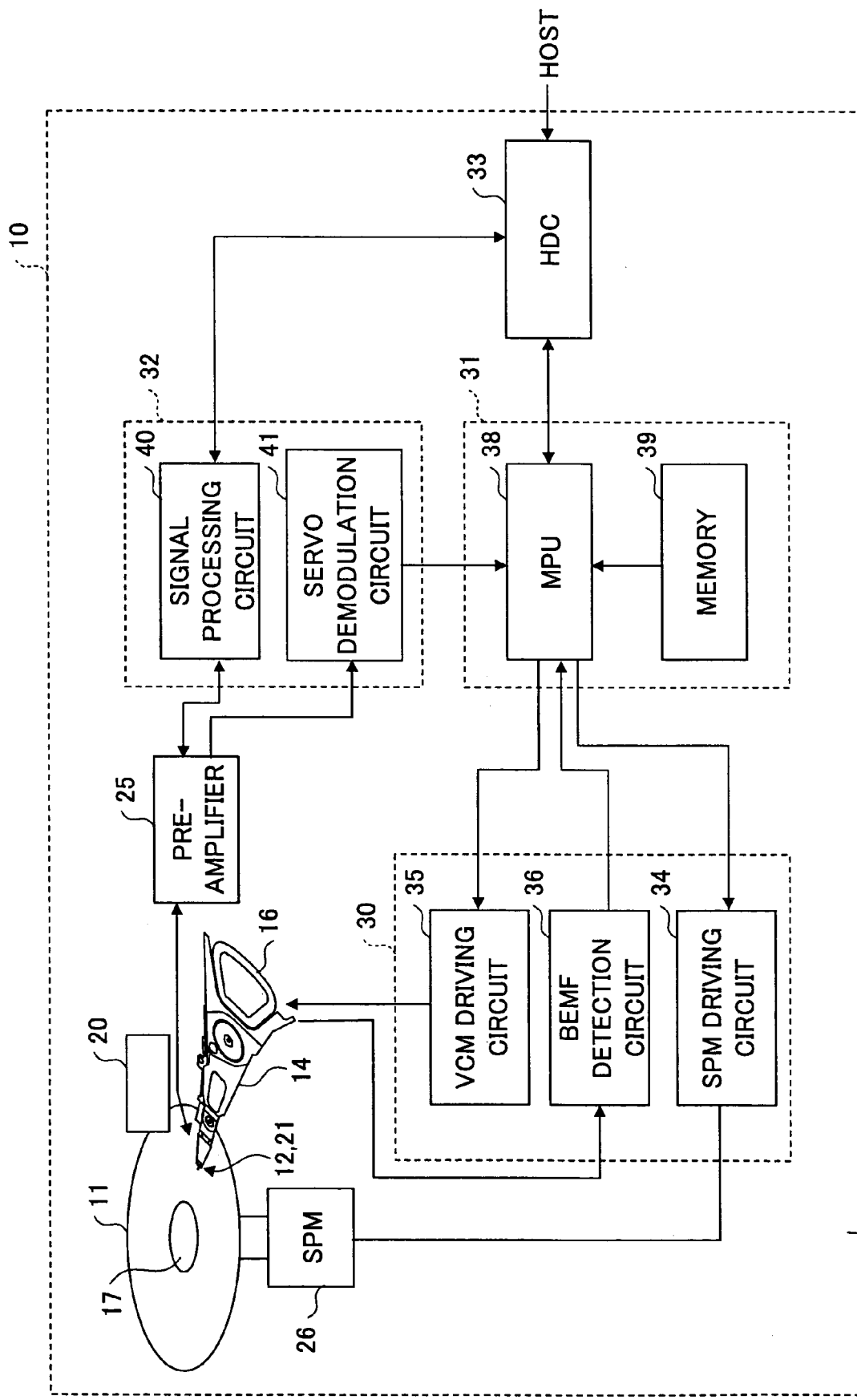
FIG. 4 is a block diagram showing a configuration of the magnetic disk device 10 according to the first embodiment.

FIG. 4 is a block diagram showing a configuration of the magnetic disk device 10 of the first embodiment.

As shown in FIG. 4, the magnetic disk device 10 includes the magnetic disk 11, the magnetic head 12, the actuator 14, a spindle motor (SPM) 26, the voice coil motor (VCM) 16, the ramp 20, the pre-amplifier 25, a VCM/SPM driver 30, a controller 31, a Read-Write-Channel IC (RDC) 32, and a hard disk controller(HDC) 33.

The VCM/SPM driver 30 includes a SPM driving circuit 34, a VCM driving circuit 35, and a back electromotive force detection circuit 36.

The Read-Write-Channel IC (RDC) 32 includes a signal processing circuit 40 and a servo demodulation circuit 41.

The spindle motor 26 is mechanically connected to the magnetic disk 11 via the hub 17, and is driven by a SPM driving current supplied from the SPM driving circuit 34 in the VCM/SPM driver 30.

The voice coil motor 16 drives the actuator 14 to move in the in-plane direction by a VCM driving current supplied from the VCM driving circuit 35 in the VCM/SPM driver 30, and controls the moving speed of the actuator 14 by using the magnitude and direction of the VCM driving current. A back electromotive force proportional to the moving speed of the actuator 14 is generated in the voice coil motor 16. The back electromotive force detection circuit 36 in the VCM/SPM driver 30 detects the magnitude of the back electromotive force in the voice coil motor 16, converts the analog signal to a digital signal, and sends the value of the magnitude of the back electromotive force (BEMF) to the controller 31.

The controller 31 includes a MPU (Micro processor) 38, a memory 39, and an Input/Output circuit (not illustrated) that connects the MPU 38 with the VCM/SPM driver 30, the RDC 32, and the hard disk controller 33.

In the memory 39, programs, parameters and a table for feed-forward (FF) control are stored. The MPU 38 send control signals to the VCM driving circuit 35 based on the programs in the memory 39 and the BEMF value supplied from the VCM driving circuit 35.

The controller 31 receives a loading command and an unloading command from the HDC 33, and the MPU 38 performs appropriate processing (described below) and sends a VCM control signal to the VCM driving circuit 35.

The pre-amplifier 25 converts the recording signal to a recording current. It also amplifies the reproduction signal and a servo signal output from the magnetic head 12 when reproducing data in the magnetic disk 11, and sends these signals to RDC 32.

In the RDC 32, the signal processing circuit 40 demodulates the amplified reproduction signal to obtain read data, and sends the data to the hard disk controller 33. In addition, the servo demodulation circuit 41 demodulates the servo signal to obtain a head position signal indicating the position of the magnetic head 12, and sends the head position signal to the MPU 38 of the controller 31.

Figure 5:
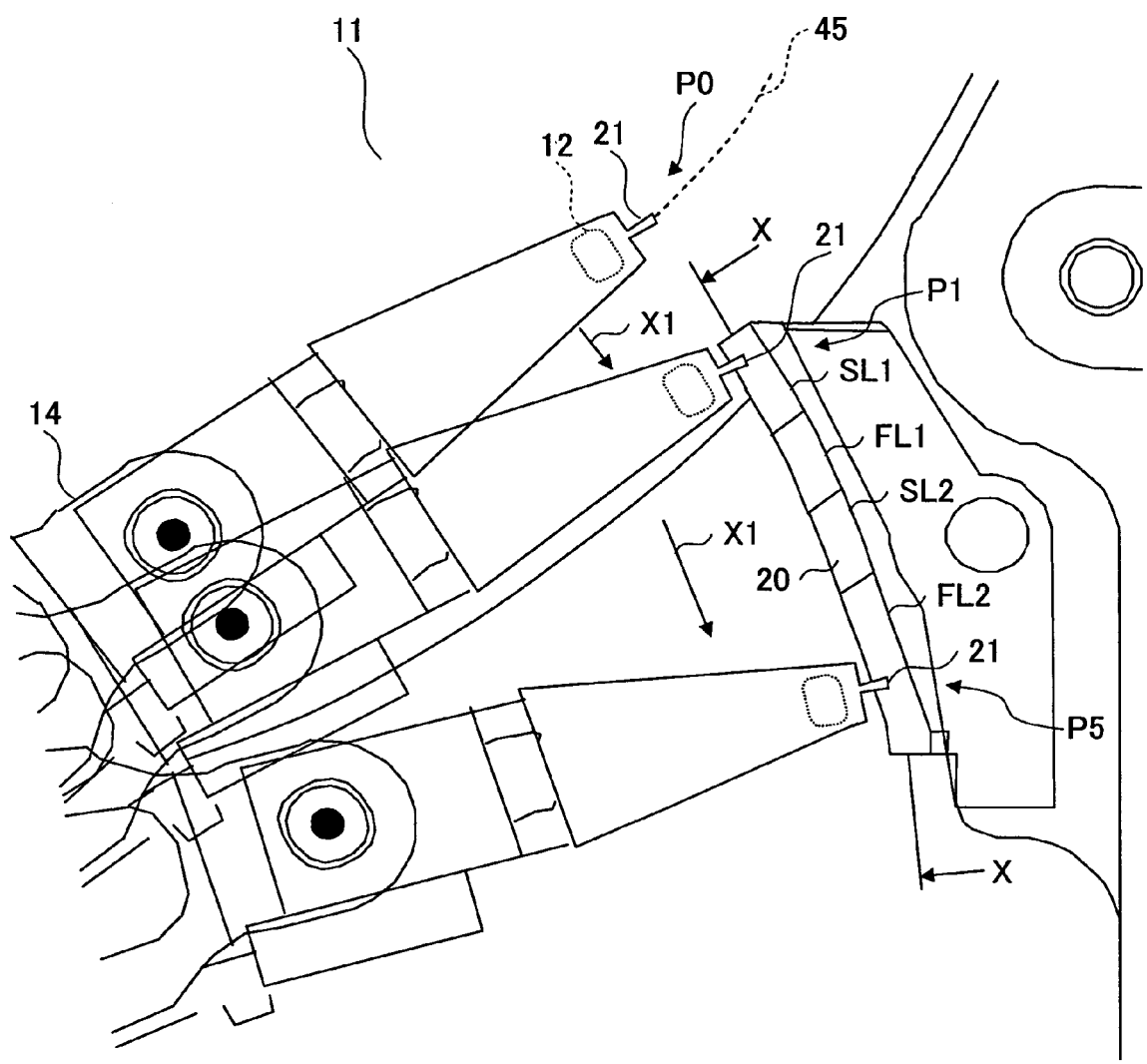
FIG. 5 is an enlarged plan view of a portion of the magnetic disk device 10 according to the first embodiment, showing a position relation of the ramp 20 and the lift tab 21 of the actuator 14.

FIG. 5 is an enlarged plan view of a portion of the magnetic disk device 10 of the first embodiment, showing a position relation of the ramp 20 and the lift tab 21 of the actuator 14.

Figure 6:
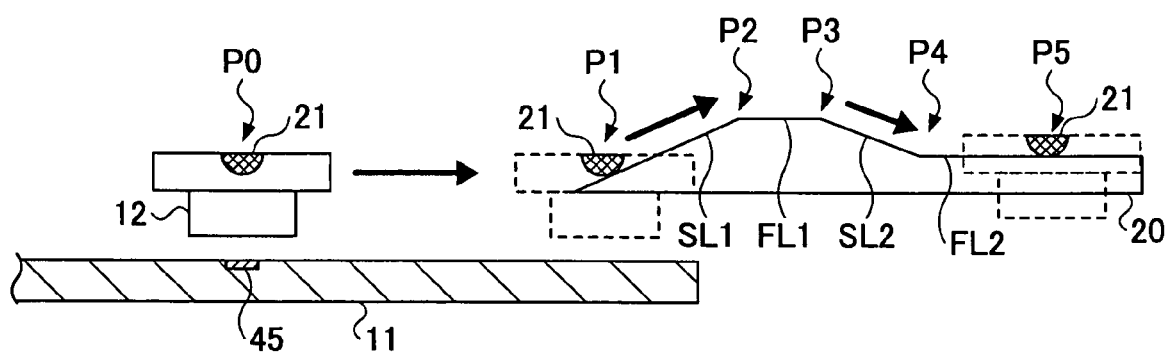
FIG. 6 is a cross-sectional view of a portion of the magnetic disk device 10 along the line indicated by arrows X in FIG. 5, where, the line indicated by the arrows X—X forms a locus along which the actuator 14 moves.

FIG. 6 is a cross-sectional view of the portion of the magnetic disk device 10 along the line indicated by the arrows X in FIG. 5. Here, the line indicated by the arrow X—X forms an arc along which the actuator 14 moves.

Referring to FIG. 5 and FIG. 6, when the magnetic disk device 10 in operation is set to be out of operation, for example, to be turned off, the actuator 14 performs the unloading operation to move the magnetic head 12, which is floating over the magnetic disk 11, to a shelter position P5 outside of the magnetic disk 11. Here, it is assumed that the magnetic disk 11 is presently in an on-track state, and at a position P0 on the outermost cylinder of the magnetic disk 11.

Once the HDC 33 sends an unloading command to the controller 31, the MPU 38 in the controller 31 sends a VCM control signal to move the actuator 14 in the outer direction of the magnetic disk 11, the actuator 14 moves in the direction indicated by an arrow X1 shown in FIG. 5 and FIG. 6, and the lift tab 21 comes into contact with the slope SL1 of the ramp 20 at a position P1. Further, driven by the VCM control signal, the lift tab 21 ascends the slope SL1 of the ramp 20, passes a flat portion FL1 and a descending slope SL2, and finally stops at the shelter position P5.

The shelter position P5, for example, is a position where the base portion 14a comes into contact the outer stopper 22. In addition, the boundary between the slope SL1 and the flat portion FL1 is denoted as position P2, the boundary between the flat portion FL1 and the slope SL2 is denoted as position P3, and the boundary between the slope SL2 and the flat portion FL2 is denoted as position P4.

Figure 7:
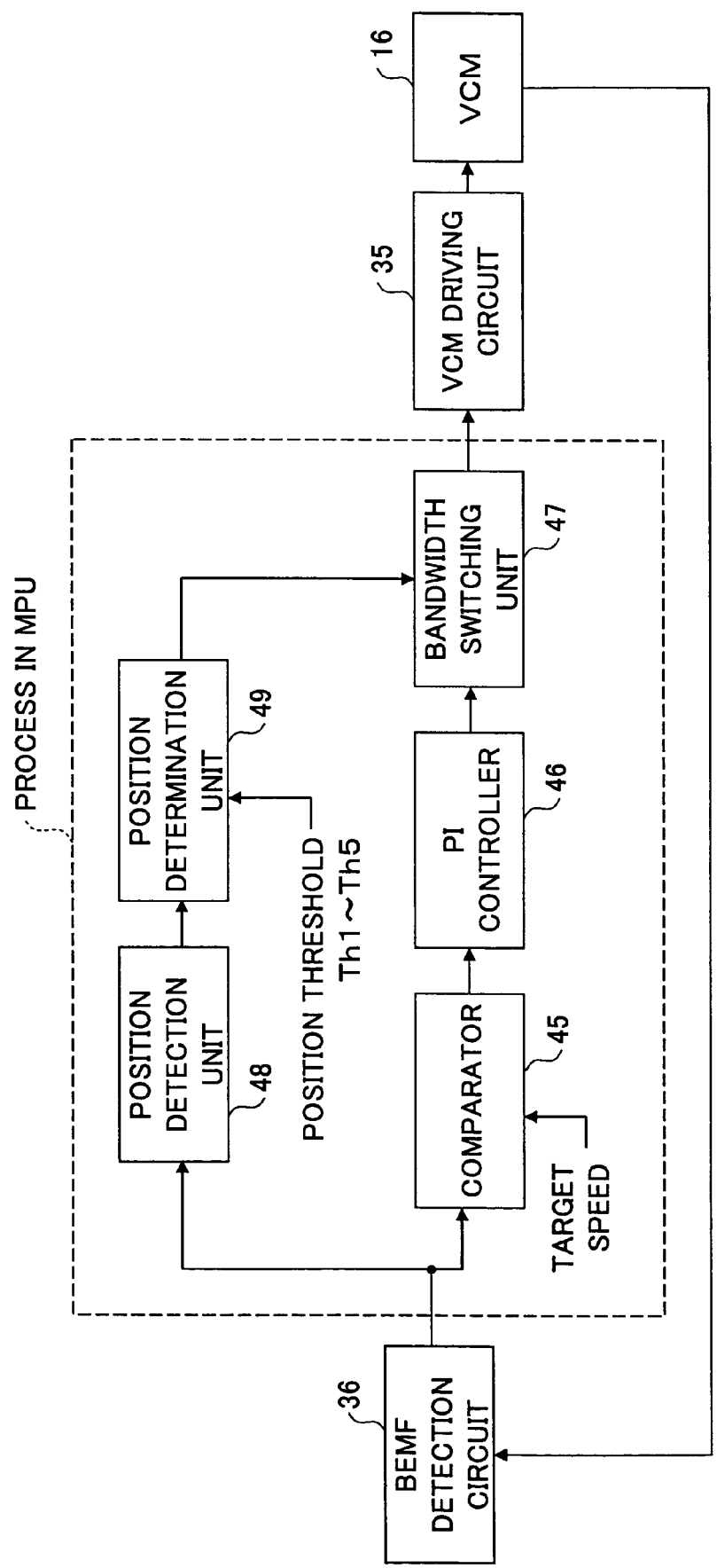
FIG. 7 is a block diagram showing a configuration of a portion of a feedback speed control system capable of switching a bandwidth according to the first embodiment.

FIG. 7 is a block diagram showing a configuration of a portion of a speed control system used in the magnetic disk device 10 according to the first embodiment, which is capable of switching the bandwidth of a feedback speed control system based on the position of the magnetic head 12.

The speed control system shown in FIG. 7 includes a comparator 45, a PI controller 46, a bandwidth switching unit 47, a position detection unit 48, and a position determination unit 49.

The comparator 45 compares the BEMF value with a target speed stored in memory 39, and calculates the difference between them. The BEMF value, which is proportional to the moving speed of the actuator 14, is supplied by the back electromotive force detection circuit 36 connected to the voice coil motor 16. The PI controller 46 outputs a control variable to the voice coil motor 16 through the VCM driving circuit 35. The position detection unit 48 calculates the position of the lift tab 21 based on the BEMF value supplied by the back electromotive force detection circuit 36. The position determination unit 49 sends a bandwidth switching signal according to the thus obtained position, and the bandwidth switching unit 47 switches the bandwidth for PI control performed by the PI controller 46.

Specifically, the back electromotive force detection circuit 36 sends the BEMF value, which is the magnitude of the back electromotive force generated in the voice coil motor 16, to the position detection unit 48.

The position detection unit 48 integrates the BEMF value from a reference position to calculate the present position of the lift tab 21, and sends a signal indicating the present position of the lift tab 21 to the position determination unit 49.

The position determination unit 49 compares the present position of the lift tab 21 with position thresholds TH1 through TH5 stored in memory 39 in FIG. 4, and sends a bandwidth switching signal to the bandwidth switching unit 47 based on the comparison results.

The bandwidth switching unit 47 changes the bandwidth of the PI control performed by the PI controller according to the bandwidth switching signal.

Here, for example, the reference position is the position P0 of the outermost cylinder of the magnetic disk 11 illustrated in FIG. 6. The position thresholds TH1 through TH5 are set equal to the position P1 through P5 illustrated in FIG. 6, respectively.

The bandwidth switching unit 47 is able to switch the bandwidth of the PI control performed by the PI controller between two bandwidths, a wide bandwidth and a usual bandwidth narrower than the wide bandwidth. For example, when the bandwidth is switched to the usual bandwidth, parameters resulting in a low gain of the feedback loop are set in use; when the bandwidth is switched to the wide bandwidth, parameters resulting in a high gain of the feedback loop are set in use. In other words, relative to the control deviation output from the comparator 45, when the bandwidth is switched to the wide bandwidth, the control variable increases compared with the case when the bandwidth is switched to the usual bandwidth.

Here, the bandwidth of the PI control is dependent on a proportional gain Kp and an integration gain Ki; usually Kp associated with the wide bandwidth is greater than that associated with the usual bandwidth; Ki is appropriately set so as not to induce oscillation when Kp increases, and Ki associated with the wide bandwidth and may be greater or lower than that associated with the usual bandwidth.

Operations performed by the comparator 45, the PI controller 46, the bandwidth switching unit 47, the position detection unit 48, and the position determination unit 49 are executed by the MPU 38 in the controller 31 shown in FIG. 4.

[Actuator Movement Control in Unloading Operation]

Below, an explanation is made of a method of the present embodiment for controlling movement of the actuator 14 in the operation of unloading the magnetic head 12.

Figure 8:
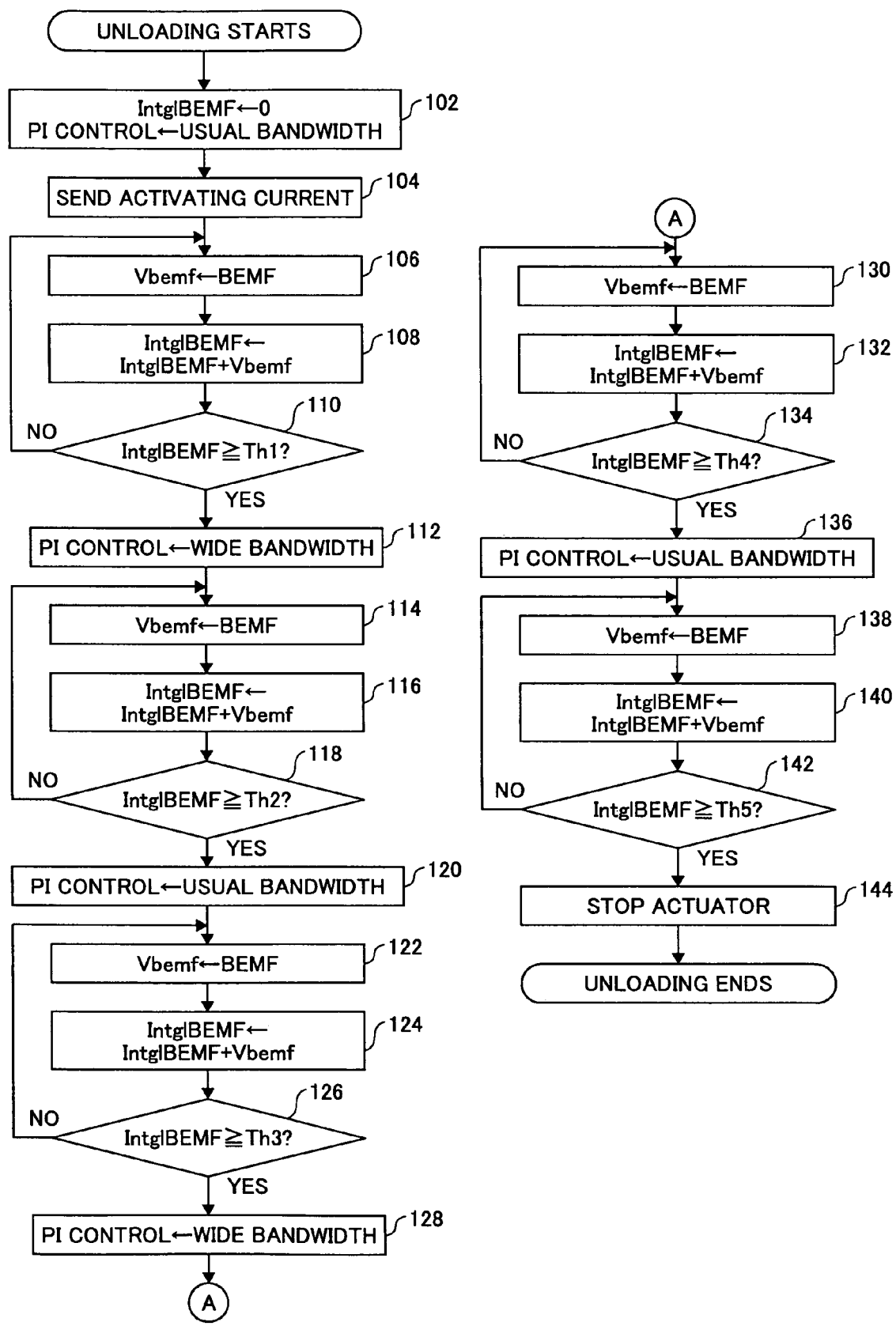
FIG. 8 is a flowchart showing a method of movement control of the actuator 14 in the operation of unloading the magnetic head 12 according to the first embodiment.

FIG. 8 is a flowchart showing the method of movement control of the actuator 14 in the operation of unloading the magnetic head 12 according to the present embodiment.

Figure 9:
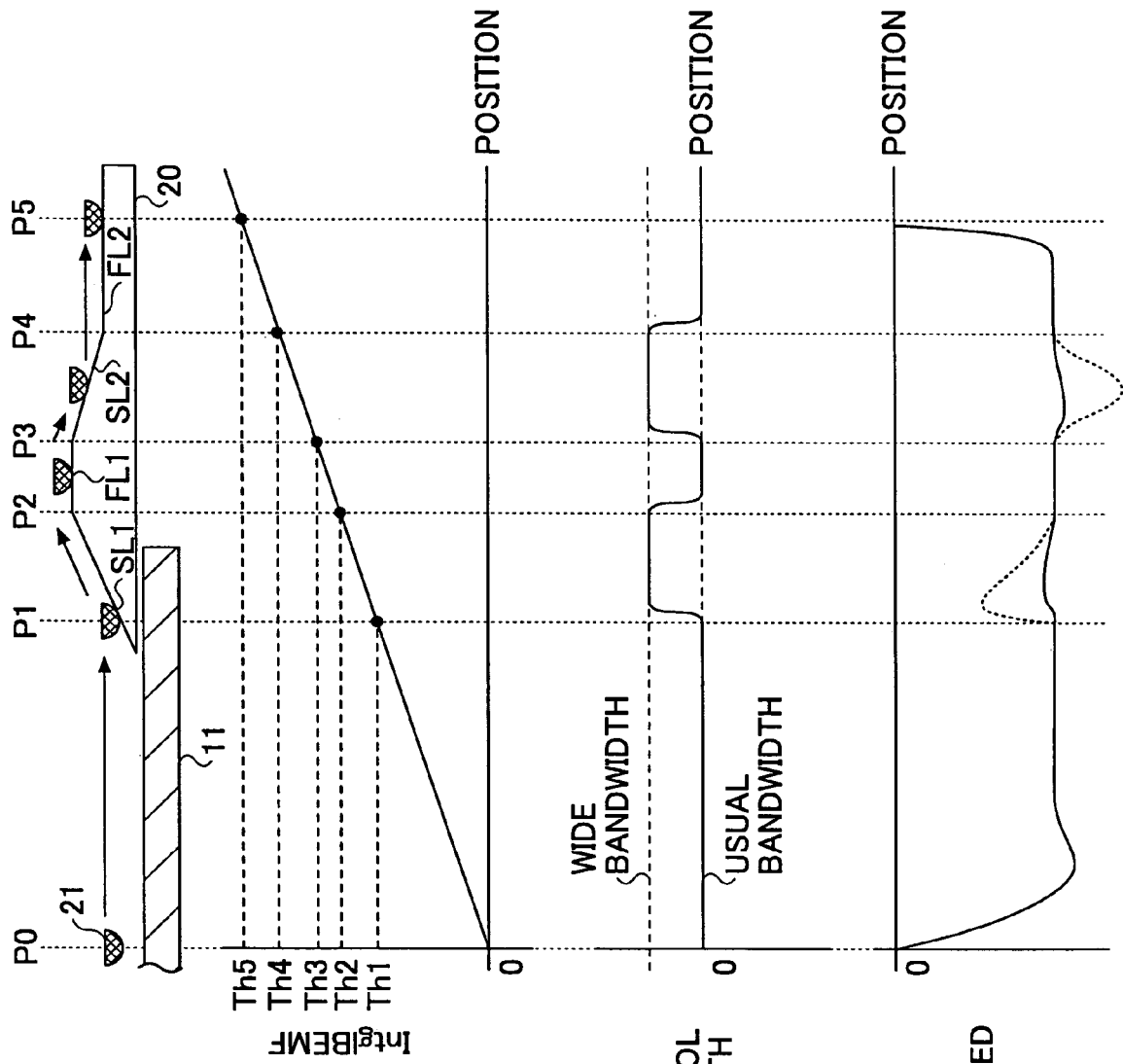
FIG. 9A is a cross-sectional view of the portion of the magnetic disk device 10 along the line indicated by the arrows X in FIG. 5, schematically showing a sequence of positions of the lift tab 21 in the operation of unloading the magnetic head 12 according to the first embodiment.
FIG. 9B is a graph showing correspondence of the integration of the BEMF (IntglBEMF) and the position thresholds Th1 through Th5 with the position of the lift tab 21 in the operation of unloading the magnetic head 12 according to the first embodiment.
FIG. 9C is a graph showing the bandwidth of the PI control set based on the position of the lift tab 21 in the operation of unloading the magnetic head 12 according to the first embodiment.
FIG. 9D is a graph showing the speed of the magnetic head 12 changing with the position of the lift tab 21 in the operation of unloading the magnetic head 12 according to the first embodiment.

FIG. 9A is a cross-sectional view of the portion of the magnetic disk device 10 along the line indicated by the arrows X in FIG. 5, schematically showing a sequence of positions of the lift tab 21 in the operation of unloading the magnetic head 12 according to the present embodiment.

FIG. 9B is a graph showing correspondence of the integration of the BEMF (IntgIBEMF) and the position thresholds Th1 through Th5 with the sequence of positions of the lift tab 21 in the operation of unloading the magnetic head 12 according to the present embodiment.

FIG. 9C is a graph showing a relation between the bandwidth of the PI control and the sequence of positions of the lift tab 21 in the operation of unloading the magnetic head 12 according to the present embodiment.

FIG. 9D is a graph showing a relation between the speed of the magnetic head 12 and the sequence of positions of the lift tab 21 in the operation of unloading the magnetic head 12 according to the present embodiment.

In FIG. 9A, for simplicity, only the lift tab 21 is illustrated, and illustration of the magnetic head 12 is omitted. In FIG. 9B through FIG. 9D, the abscissas represent distances from the reference position.

Referring to FIG. 8, in step 102, receiving an unloading command from the HDC 33 in FIG. 4, MPU 38 in the controller 31 sets the integration of the BEMF value (IntgIBEMF) to zero, and the bandwidth switching unit 47 sets the PI control bandwidth to the usual bandwidth.

Here, it is assumed that the magnetic head 12 is at the position P0 of the outermost cylinder of the magnetic disk 11 illustrated in FIG. 6, that is, the reference position is the position P0 of the outermost cylinder of the magnetic disk 11. Because the outermost cylinder of the magnetic disk 11 is the cylinder closest to the ramp 20, noise hardly causes errors to the integration of BEMF (IntgIBEMF) (as described below), and it is possible to accurately calculate the position of the lift tab 21.

It should be noted that the reference position is not limited to the outermost cylinder of the magnetic disk 11, but may be set to other peripheral cylinders. If the magnetic head 12 is at positions other than the outermost cylinder of the magnetic disk 11 when the unloading command is received, first, the magnetic head 12 is moved to the outermost cylinder of the magnetic disk 11 as a usual seek operation, and then step 102 is executed. Because the moving speed of the magnetic head 12 is much higher in the usual seek operation than in the unloading operation, moving the magnetic head 12 by a usual seek operation can shorten the time required for the unloading operation.

In step 104, in order to drive the actuator 14 to move, MPU 38 sends an activating current to the voice coil motor 16 through the VCM driving circuit 35. The magnitude of the activating current is adjusted to a specified value by, for example, the feedback control of the moving speed of the actuator 14.

In step 106, the back electromotive force detection circuit 36 detects the back electromotive force generated in the voice coil motor 16 due to movement of the actuator 14, and the detected magnitude of the back electromotive force (BEMF) is assigned to a parameter Vbemf in the position detection unit 48.

In step 108, the position detection unit 48 accumulates the parameter Vbemf to IntgBEMF to continue integration of BEMF.

In step 110, the position determination unit 49 determines whether the integration of BEMF (IntgIBEMF) is greater than or equal to the position threshold TH1. If the integration of BEMF is less than the position threshold TH1, step 106 through step 110 are repeated to move the actuator 14 on at a target speed until the integration of BEMF (IntgIBEMF) becomes equal to the position threshold TH1.

If the integration of BEMF (IntgIBEMF) is greater than or equal to the position threshold TH1, the routine proceeds to step 112.

In step 112, as shown in FIG. 9C, the bandwidth switching unit 47 sets the PI control bandwidth to the wide bandwidth. As shown in FIG. 9A and FIG. 9B, equality of the integration of BEMF (IntgIBEMF) and the position threshold TH1 indicates that the lift tab 21 reaches the position P1, where the lift tab 21 is nearly in contact with the ramp 20.

As described above, in the related art, the speed decrease is detected when the lift tab 21 is brought into contact with the ramp 20, and based on the detection results, the PI control bandwidth is switched. In contrast, in the present control method, the PI control bandwidth is switched based on positions, therefore, the time delay of switching can be suppressed. Especially, as shown by the solid line in FIG. 9D, the notable speed drop (shown by the dashed line in FIG. 9D) of the actuator 14 after contact with the ramp 20 occurring in the related art can be effectively suppressed.

In step 114, with the PI control in the wide bandwidth mode, the lift tab 21 ascends the slope SL1.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 116, the position detection unit 48 accumulates the parameter Vbemf to IntgBEMF to continue integration of BEMF.

In step 118, the position determination unit 49 determines whether the integration of BEMF (IntglBEMF) is greater than or equal to the position threshold TH2. If the integration of BEMF is less than the position threshold TH2, step 114 through step 118 are repeated to move the actuator 14 on at the target speed with the PI control in the wide bandwidth mode, until the integration of BEMF (IntglBEMF) becomes equal to the position threshold TH2.

If the integration of BEMF (IntglBEMF) is greater than or equal to the position threshold TH2, the routine proceeds to step 120.

In step 120, as shown in FIG. 9C, the bandwidth switching unit 47 switches the PI control bandwidth to the usual bandwidth. As shown in FIG. 9A, the lift tab 21 reaches the position P2, that is, the boundary of the slope SL1 and the flat portion FL1. In the flat portion FL1, the PI control is more stable in the usual bandwidth mode than in the wide bandwidth mode.

In step 122, with the PI control in the usual bandwidth mode, the lift tab 21 moves in the flat portion FL1 of the ramp 20.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 124, the position detection unit 48 accumulates the parameter Vbemf to IntgBEMF to continue integration of BEMF.

In step 126, the position determination unit 49 determines whether the integration of BEMF (IntglBEMF) is greater than or equal to the position threshold TH3. If the integration of BEMF is less than the position threshold TH3, step 122 through step 126 are repeated to move the actuator 14 on at the target speed with the PI control in the usual bandwidth mode, until the integration of BEMF (IntglBEMF) becomes equal to the position threshold TH3.

If the integration of BEMF (IntglBEMF) is greater than or equal to the position threshold TH3, the routine proceeds to step 128.

In step 128, as shown in FIG. 9C, the bandwidth switching unit 47 switches the PI control bandwidth to the wide bandwidth.

As shown in FIG. 9A and FIG. 9B, equality of the integration of BEMF (IntglBEMF) and the position threshold TH3 indicates that the lift tab 21 reaches the position P3, the boundary of the flat portion FL1 and the slope SL2 of the ramp 20.

In the present method, the PI control bandwidth is also switched to the wide bandwidth based on positions of the lift tab 21 when the lift tab 21 descends the slope SL2. Therefore, as shown by the solid line in FIG. 9D, both the time delay of switching and the increase of the speed can be suppressed. As a result, it is possible to precisely control the speed of the magnetic head 12 when the lift tab 21 passes through the slope SL2, and thereby this enables suppression of the deviation from the target speed when the lift tab 21 passes through the position P4. Consequently, it is possible to accurately control the speed of the lift tab 21 when the lift tab 21 finally reaches the position P5, and stop the lift tab 21 at a specified position. Furthermore, if the lift tab 21 is stopped when the base portion 14*a* and the outer stopper 22 come into contact, it is possible to reduce the shock due to the contact between the base portion 14*a* and the outer stopper 22.

In step 130, with the PI control in the wide bandwidth mode, the lift tab 21 descends the ramp 20 along the slope SL2.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 132, the position detection unit 48 accumulates the parameter Vbemf to IntgBEMF to continue integration of BEMF.

In step 134, the position determination unit 49 determines whether the integration of BEMF (IntglBEMF) is greater than or equal to the position threshold TH4. If the integration of BEMF is less than the position threshold TH4, step 130 through step 134 are repeated to move the actuator 14 on at the target speed with the PI control in the wide bandwidth mode, until the integration of BEMF (IntglBEMF) becomes equal to the position threshold TH4.

If the integration of BEMF (IntglBEMF) is greater than or equal to the position threshold TH4, the routine proceeds to step 136.

In step 136, as shown in FIG. 9C, the bandwidth switching unit 47 switches the PI control bandwidth to the usual bandwidth. As shown in FIG. 9A, the lift tab 21 reaches the position P4, that is, the boundary of the slope SL2 and the flat portion FL2. In the flat portion FL2, the PI control is more stable in the usual bandwidth mode than in the wide bandwidth mode.

In step 138, with the PI control in the usual bandwidth mode, the lift tab 21 moves in the flat portion FL1 of the ramp 20.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 140, the position detection unit 48 accumulates the parameter Vbemf to IntgBEMF to continue integration of BEMF.

In step 142, the position determination unit 49 determines whether the integration of BEMF (IntglBEMF) is greater than or equal to the position threshold TH5. If the integration of BEMF is less than the position threshold TH5, step 136 through step 142 are repeated to move the actuator 14 on at the target speed with the PI control in the usual bandwidth mode, until the integration of BEMF (IntglBEMF) becomes equal to the position threshold TH5.

If the integration of BEMF (IntglBEMF) is greater than or equal to the position threshold TH5, the routine proceeds to step 144.

In step 144, as shown in FIG. 9A and FIG. 9B, equality of the integration of BEMF (IntglBEMF) and the position threshold TH5 indicates that the lift tab 21 reaches the shelter position P5. Thus, the target speed is set to zero and the actuator 14 is stopped. Hence, the unloading operation is completed.

Instead of the position P5, the actuator 14 may also be stopped when the base portion 14*a* of the actuator 14 mechanically contacts the outer stopper 22. Further, step 122 through step 134 and step 138 through step 142 are not indispensable, and can be omitted if necessary.

[Actuator Movement Control in Loading Operation]

Below, an explanation is made of a method of the present embodiment for controlling movement of the actuator 14 in the operation of loading the magnetic head 12.

Figure 10:
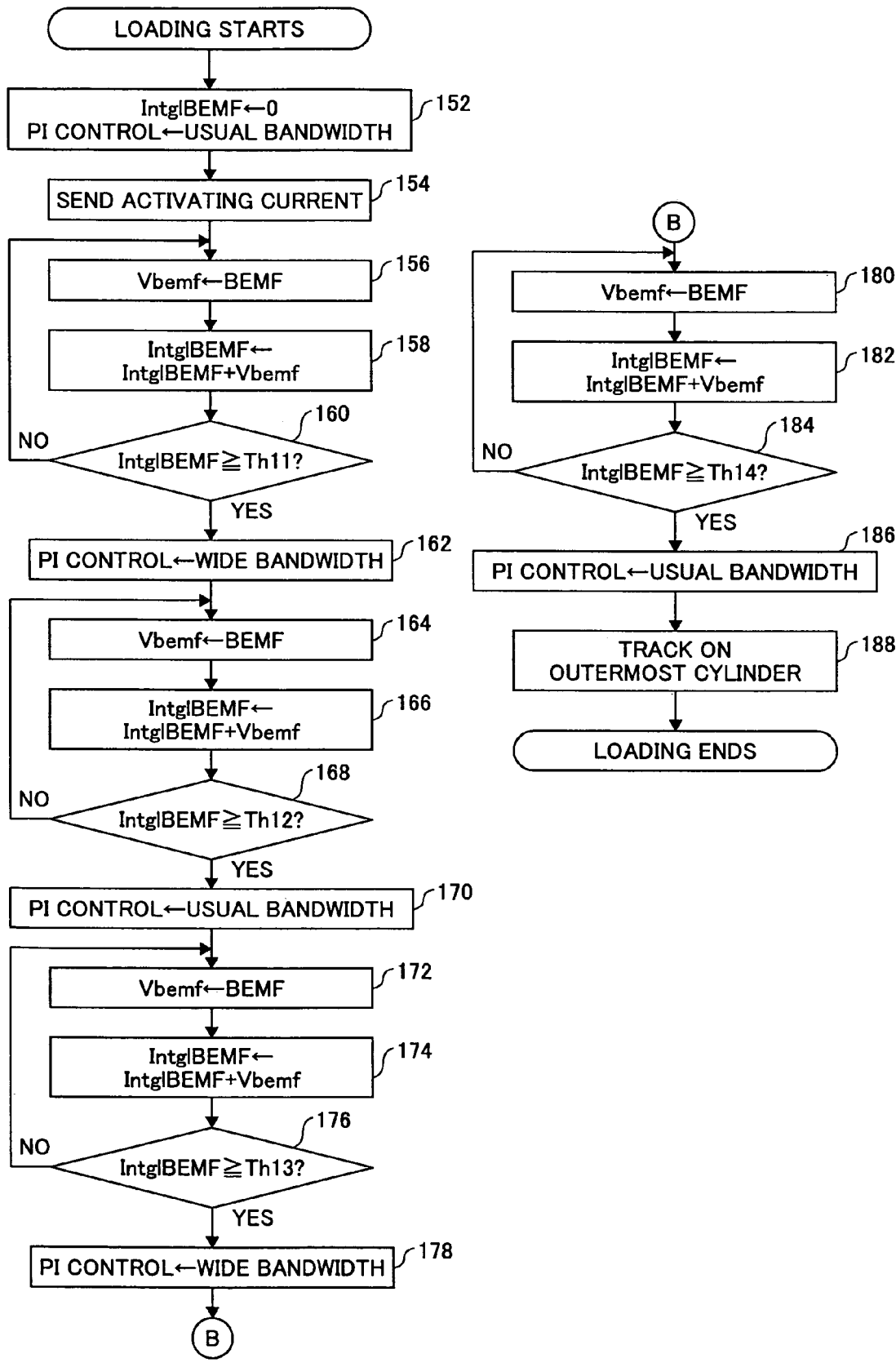
FIG. 10 is a flowchart showing the method of movement control of the actuator 14 in the operation of loading the magnetic head 12 according to the first embodiment.

FIG. 10 is a flowchart showing the method of movement control of the actuator 14 in the operation of loading the magnetic head 12 according to the present embodiment.

FIG. 11A is a cross-sectional view of the portion of the magnetic disk device 10 along the line indicated by the arrows X in FIG. 5, schematically showing a sequence of positions of the lift tab 21 in the operation of loading the magnetic head 12 according to the present embodiment.

FIG. 11B is a graph showing correspondence of the integration of the BEMF (IntglBEMF) and the position thresholds Th1 through Th5 with the sequence of positions of the lift tab 21 in the operation of loading the magnetic head 12 according to the present embodiment.

FIG. 11C is a graph showing a relation between the bandwidth of the PI control and the sequence of positions of the lift tab 21 in the operation of loading the magnetic head 12 according to the present embodiment.

FIG. 11D is a graph showing a relation between the speed of the magnetic head 12 and the sequence of positions of the lift tab 21 in the operation of loading the magnetic head 12 according to the present embodiment.

In FIG. 11A, for simplicity, only the lift tab 21 is illustrated, and illustration of the magnetic head 12 is omitted. In FIG. 11B through FIG. 9D, the abscissas represent distances from the reference position.

In the following description, initially the reference position is the shelter position P5; the position thresholds TH11, TH12, TH13, TH14 and TH15 correspond to the position P4, P3, P2, P1, and P0, respectively; the PI control bandwidth is switched to the wide bandwidth at positions P2 and P4, with the position P2 being the boundary between the slope SL1 and the flat portion FL1, and the position P4 being the boundary between the slope SL2 and the flat portion FL2.

Referring to FIG. 10, in step 152, receiving a loading command from the HDC 33 shown in FIG. 4, MPU 38 in the controller 31 sets the integration of the BEMF value (IntglBEMF) to zero, and the bandwidth switching unit 47 sets the PI control bandwidth to the usual bandwidth.

In this step, the magnetic head 12 is at the shelter position P5, that is, the reference position, and as shown in FIG. 3, the base portion 14a and the outer stopper 22 are in contact with each other.

In step 154, in order to drive the actuator 14 to move, MPU 38 sends an activating current to the voice coil motor 16 through the VCM driving circuit 35. The magnitude of the activating current is adjusted to a specified value by, for example, the feedback control of the moving speed of the actuator 14.

In step 156, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 158, the position detection unit 48 accumulates the parameter Vbemf to IntgBEMF to continue integration of BEMF.

In step 160, the position determination unit 49 determines whether the integration of BEMF (IntglBEMF) is greater than or equal to the position threshold TH11. If the integration of BEMF is less than the position threshold TH11, indicating that the lift tab 21 has not reached the position P4, that is, the lift tab 21 has not reached the slope SL2, step 156 through step 160 are repeated to move the actuator 14 on at a target speed until the integration of BEMF (IntglBEMF) becomes equal to the position threshold TH11.

If the integration of BEMF (IntglBEMF) is greater than or equal to the position threshold TH11, the routine proceeds to step 162.

Figure 1:
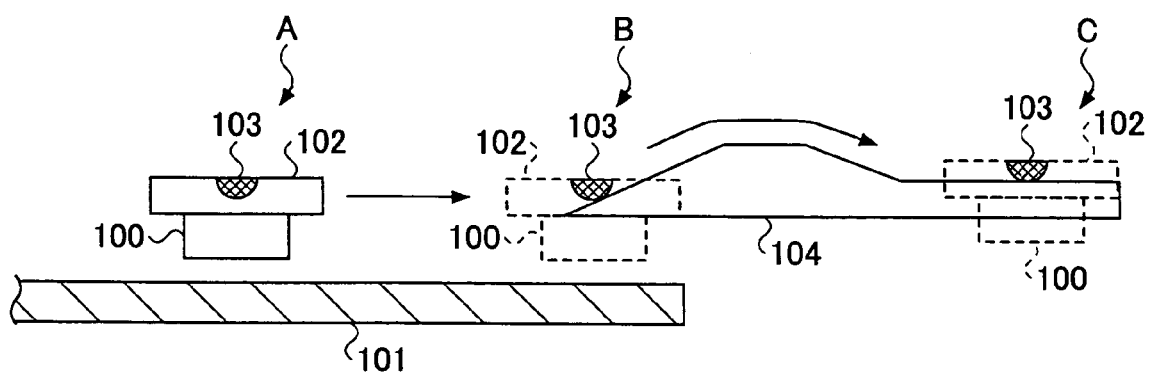
FIG. 1 is view for schematically explaining the ramp load/unload technique.
Figure 2:
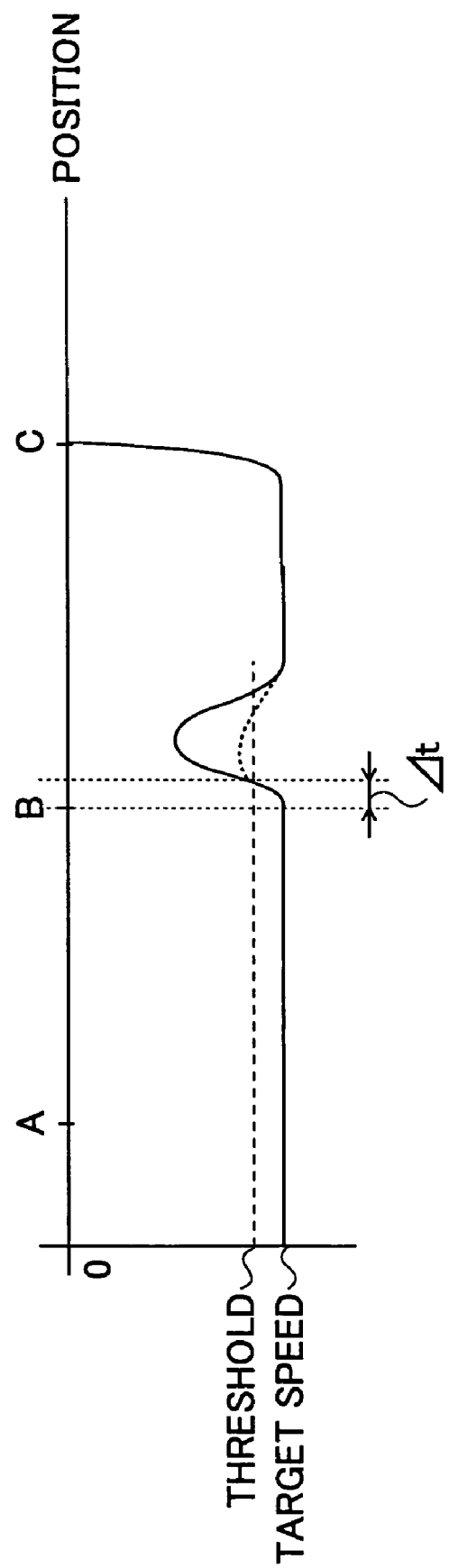
FIG. 2 is a graph showing variation of speed of the actuator 102 during a feedback control of the related art.

In step 162, as shown in FIG. 1C, the bandwidth switching unit 47 sets the PI control bandwidth to the wide bandwidth. As shown in FIG. 11A and FIG. 11B, equality of the integration of BEMF (IntglBEMF) and the position threshold TH11 indicates that the lift tab 21 reaches the position P4, that is, the lift tab 21 is nearly reaches the slope SL2.

Subsequently, the lift tab 21 ascends the slope SL2. As described above, in the related art, the speed drop occurs as shown by the dashed line in FIG. 1D. In contrast, in the present control method, by switching the PI control bandwidth to the wide bandwidth, the speed drop is suppressed, and the seed of the lift tab 21 can be controlled to vary as shown by the solid line.

In step 164, with the PI control in the wide bandwidth mode, the lift tab 21 ascends the slope SL2. The back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 166, the position detection unit 48 accumulates the parameter Vbemf to IntgBEMF to continue integration of BEMF.

In step 168, the position determination unit 49 determines whether the integration of BEMF (IntglBEMF) is greater than or equal to the position threshold TH12. If the integration of BEMF is less than the position threshold TH2, step 164 through step 168 are repeated to move the actuator 14 on at the target speed with the PI control in the wide bandwidth mode, until the integration of BEMF (IntglBEMF) becomes equal to the position threshold TH12.

If the integration of BEMF (IntglBEMF) is greater than or equal to the position threshold TH12, the routine proceeds to step 170.

In step 170, as shown in FIG. 1C, the bandwidth switching unit 47 switches the PI control bandwidth to the usual bandwidth. As shown in FIG. 11A, the lift tab 21 reaches the position P3, that is, the boundary of the slope SL2 and the flat portion FL1. In the flat portion FL1, the PI control is more stable in the usual bandwidth mode than in the wide bandwidth mode.

In step 172, with the PI control in the usual bandwidth mode, the lift tab 21 moves in the flat portion FL1 of the ramp 20.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 174, the position detection unit 48 accumulates the parameter Vbemf to IntgBEMF to continue integration of BEMF.

In step 176, the position determination unit 49 determines whether the integration of BEMF (IntglBEMF) is greater than or equal to the position threshold TH13. If the integration of BEMF is less than the position threshold TH13, step 172 through step 176 are repeated to move the actuator 14 on at the target speed with the PI control in the usual bandwidth mode, until the integration of BEMF (IntglBEMF) becomes equal to the position threshold TH13.

If the integration of BEMF (IntglBEMF) is greater than or equal to the position threshold TH13, the routine proceeds to step 178.

In step 178, as shown in FIG. 11C, the bandwidth switching unit 47 switches the PI control bandwidth to the wide bandwidth.

As shown in FIG. 11A and FIG. 11B, equality of the integration of BEMF (IntglBEMF) and the position threshold TH13 indicates that the lift tab 21 reaches the position P2, the boundary of the flat portion FL1 and the slope SL1 of the ramp 20.

In the present method, when the lift tab 21 descends the slope SL1, the PI control bandwidth is switched to the wide bandwidth based on positions of the lift tab 21. Therefore, as shown by the solid line in FIG. 1D, the time delay of switching can be suppressed, and the increase of the speed can be suppresses quickly. As a result, the lift tab 21 descends the slope SL1 at a moving speed nearly equal to the target speed, thereby, a normal air bearing can be formed between the magnetic head 12 and the surface of the magnetic disk 11, and it is possible to prevent contact of the magnetic head 12 with the magnetic disk 11.

In step 180, with the PI control in the wide bandwidth mode, the lift tab 21 descends the slope SL1.

Similarly, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 182, the position detection unit 48 accumulates the parameter Vbemf to IntgBEMF to continue integration of BEMF.

In step 184, the position determination unit 49 determines whether the integration of BEMF (IntglBEMF) is greater than or equal to the position threshold TH14. If the integration of BEMF is less than the position threshold TH14, step 180 through step 184 are repeated to move the actuator 14 on at the target speed with the PI control in the wide bandwidth mode, until the integration of BEMF (IntglBEMF) becomes equal to the position threshold TH14.

If the integration of BEMF (IntglBEMF) is greater than or equal to the position threshold TH14, the routine proceeds to step 186.

In step 186, as shown in FIG. 1C, the bandwidth switching unit 47 switches the PI control bandwidth to the usual bandwidth. As shown in FIG. 11A, the lift tab 21 reaches the position P1, that is, to be out of contact with the ramp 20. When the magnetic head 12 is floating over the magnetic disk 11, the PI control is more stable in the usual bandwidth mode than in the wide bandwidth mode.

In step 188, the magnetic head 12 reproduces servo information recorded in the magnetic disk 11, and moves to an on-track position of the outermost cylinder. So far, the loading operation is completed.

In the method for actuator movement control according to the present embodiment in the operations of loading and unloading the magnetic head 12, with the outermost cylinder as a reference position, the position detection unit 48 calculates the present position of the lift tab 21 based on the BEMF value sent from the back electromotive force detection circuit 36, and determines whether the present position of the lift tab 21 equals specified positions P1 through P4, and based on the determination results, the bandwidth switching unit 47 switches the bandwidth of the PI control.

Therefore, it is possible to switch the bandwidth of the PI control to rapidly suppress fast change of the speed before or during a change of the moving speed of the actuator, for example, a rapid drop of the moving speed. Meanwhile, in a region where the speed change of the actuator is small, the bandwidth is switched to the usual bandwidth, and thereby it is possible to improve stability of the speed control.

Second Embodiment

A second embodiment of the actuator movement control method of the present invention is described below. The magnetic disk device of the present embodiment is the same as that of the first embodiment, and the same reference numbers are used for the same elements.

Specifically, the present embodiment relates to a method of controlling movement of the actuator 14 in the operation of loading and unloading the magnetic head 12.

The actuator movement control method of the present embodiment is basically the same as that of the first embodiment, except that the definitions of the position thresholds are different.

Figure 12A:
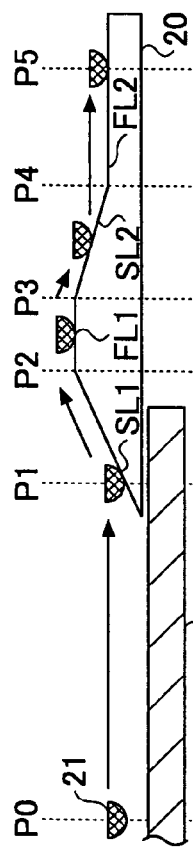
FIG. 12A is a cross-sectional view of a portion of the magnetic disk device 10 schematically showing a sequence of positions of the lift tab 21 in the operation of unloading the magnetic head 12 according to a second embodiment.

FIG. 12A is a cross-sectional view of a portion of the magnetic disk device 10 schematically showing a sequence of positions of the lift tab 21 in the operation of unloading the magnetic head 12 according to the present embodiment.

Figure 12B:
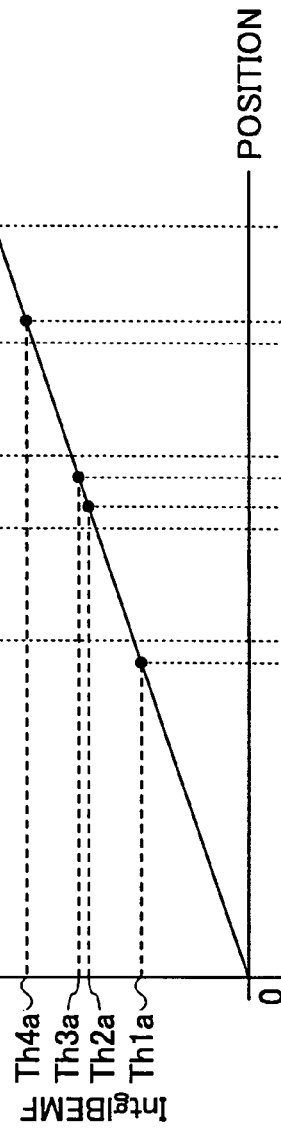
FIG. 12B is a graph showing correspondence of the integration of the BEMF (IntglBEMF) and the position thresholds Th1$a$ through Th4$a$ with the position of the lift tab 21 in the operation of unloading the magnetic head 12 according to the second embodiment.

FIG. 12B is a graph showing correspondence of the integration of the BEMF (IntglBEMF) and the position thresholds Th1a through Th4a with the sequence of positions of the lift tab 21 in the operation of unloading the magnetic head 12 according to the present embodiment.

Figure 12C:
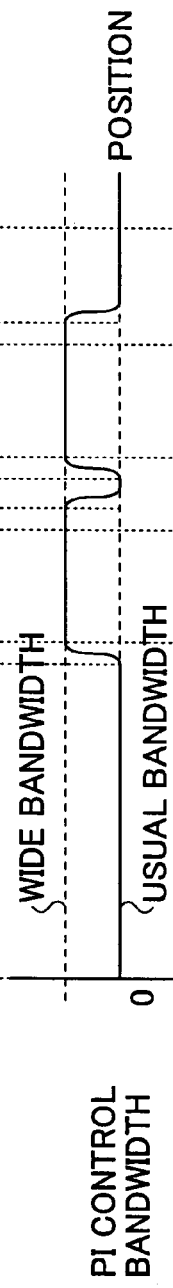
FIG. 12C is a graph showing the bandwidth of the PI control set based on the position of the lift tab 21 in the operation of unloading the magnetic head 12 according to the second embodiment.

FIG. 12C is a graph showing a relation between the bandwidth of the PI control and the sequence of positions of the lift tab 21 in the operation of unloading the magnetic head 12 according to the present embodiment.

Figure 12D:
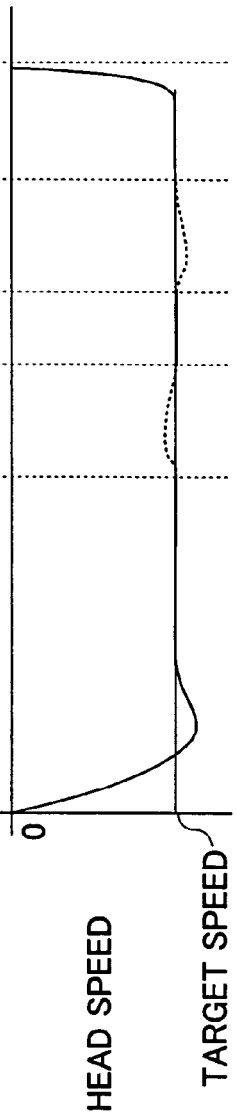
FIG. 12D is a graph showing the moving speed of the magnetic head 12 changing with the position of the lift tab 21 in the operation of unloading the magnetic head 12 according to the second embodiment.

FIG. 12D is a graph showing a relation between the moving speed of the magnetic head 12 and the sequence of positions of the lift tab 21 in the operation of unloading the magnetic head 12 according to the present embodiment.

As shown in FIG. 12B, comparing the position thresholds Th1a through Th4a with the position thresholds Th1 through Th4 in the first embodiment, which correspond to the positions P1 through P4, it is set that Th1a<Th1, Th2a>Th2, Th3a<Th3, Th4a>Th4. That is, relative to the positions P1 through P4 in FIG. 12A, in the unloading direction, that is, the right direction in FIG. 12B, the position threshold Th1a is prior to the position P1, the position threshold Th2a is behind (after) the position P2, the position threshold Th3a is prior to the position P3, and the position threshold Th4a is behind the position P2.

By setting the position thresholds in this way, it is possible to easily reduce the delay of bandwidth switching caused by noise, which is generated in the integration of the BEMF (IntglBEMF), corresponding to the moving speed of the actuator 14.

Preferably, the respective differences between the position thresholds Th1a, Th2a, Th3a, and Th4a and the position thresholds Th1, Th2, Th3, and Th4 are in the range from 10 μm to 150 μm. If the difference is less than 10 μm, the effect is not sufficient, and if the difference is above 150 μm, the stability of the speed control is degraded.

With thus defined position thresholds Th1a, Th2a, Th3a, and Th4a, and following steps similar with the flowchart in FIG. 8, the actuator 14 can be controlled so that the speed of the actuator 14 follows the solid in FIG. 12D, specifically, the decrease of the speed occurring when the lift tab 21 comes into contact with the ramp 20 is better suppressed than that in the first embodiment (FIG. 11D) as shown by the dashed line in FIG. 12D.

In addition, even if errors are incorporated into the IntglBEMF, switching to the wide bandwidth can be reliably achieved between P1 and P2 and between P3 and P4.

In the operation of loading and unloading the magnetic head 12, by modifying the definitions of the position thresholds Th1, Th2, Th3, and Th4, in the same manner as above, the same effect can be achieved.

Third Embodiment

The magnetic disk device of the present embodiment is basically the same as that of the first embodiment, except that in control of movement of an actuator when loading and unloading a magnetic head, instead of switching the bandwidth of PI control, a feed-forward control variable is superposed on a control variable of a feedback speed control system.

Below, the same reference numbers are used for the same elements as in the first embodiment.

Figure 13:
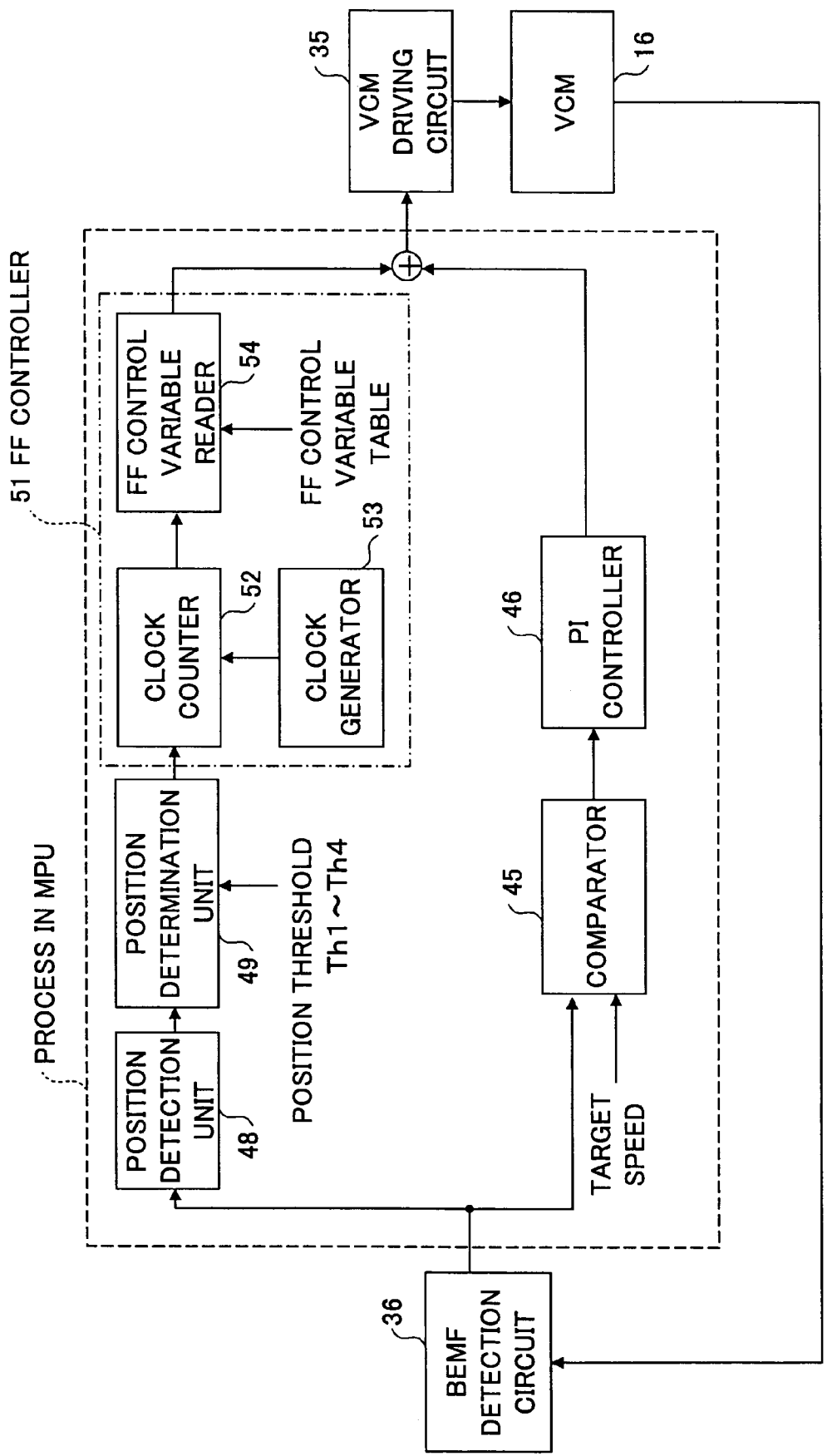
FIG. 13 is a block diagram showing a configuration of a portion of a speed control system according to a third embodiment of the present invention, which is capable of superposing a feed-forward control variable on a feedback control variable of a feedback speed control system.

FIG. 13 is a block diagram showing a configuration of a portion of a speed control system according to the third embodiment, which is capable of superposing a feed-forward control variable on a feedback control variable of a feedback speed control system.

FIG. 14A and FIG. 14B show tables containing data of the feed-forward control variable used in the operation of unloading the magnetic head 12, where, FIG. 14A shows a first table containing the feed-forward control variables used when the lift tab 21 comes into contact with the ramp 20 and ascends the slope SL1 of the ramp 20, and FIG. 14B shows a second table containing the feed-forward control variables used when the lift tab 21 decends the slope SL2 of the ramp 20.

The speed control system shown in FIG. 13 includes a comparator 45, a PI controller 46, a feed-forward controller 51, a position detection unit 48, and a position determination unit 49.

The feed-forward controller 51 includes a clock counter 52, a clock generator 53, and a feed-forward control variable reader 54.

The comparator 45 compares the BEMF value with a target speed stored in memory 39, and calculates the difference between them. The BEMF value, which is proportional to the moving speed of the actuator 14, is supplied by the back electromotive force detection circuit 36 connected to the voice coil motor 16. The PI controller 46 outputs a control variable to the voice coil motor 16 through the VCM driving circuit 35. The position detection unit 48 calculates the position of the lift tab 21 based on the BEMF value supplied by the back electromotive force detection circuit 36. The position determination unit 49 sends a counting start signal to the clock counter 52 in the feed-forward controller 51, and the feed-forward control variable reader 54 reads out a feed-forward control variable from a feed-forward control variable table loaded in the memory 39. The feed-forward control variable from the feed-forward control variable reader 54 is superposed on the feedback control variable from the PI controller 46, and the sum is used to control the voice coil motor 16 via the VCM driving circuit 35.

Specifically, the back electromotive force detection circuit 36 sends the BEMF value, which is the magnitude of the back electromotive force generated in the voice coil motor 16, to the position detection unit 48.

The position detection unit 48 integrates the BEMF value from a reference position to calculate the present position of the lift tab 21, and sends a signal indicating the present position of the lift tab 21 to the position determination unit 49.

The position determination unit 49 compares the present position of the lift tab 21 with position thresholds TH1 through TH5 stored in memory 39 in FIG. 4, and sends the counting start signal when the present position of the lift tab 21 equals one of the position thresholds TH1 through TH5, to start the clock counter 52. Based on the time counted by the clock counter 52, the feed-forward control variable reader 54 reads out a feed-forward control variable from the feed-forward control variable tables shown in FIG. 14A or FIG. 14B. The feed-forward control variable from the feed-forward control variable reader 54 is superposed on the feedback control variable from the PI controller 46, and the sum is used to control the voice coil motor 16 via the VCM driving circuit 35.

Operations performed by the comparator 45, the PI controller 46, the position detection unit 48, the position determination unit 49, clock counter 52, a clock generator 53, and a feed-forward control variable reader 54 are executed by the MPU 38 in the controller 31 shown in FIG. 4.

Below, an explanation is made of a method for controlling movement of the actuator 14 in the operation of unloading the magnetic head 12 according to the present embodiment.

Figure 15:
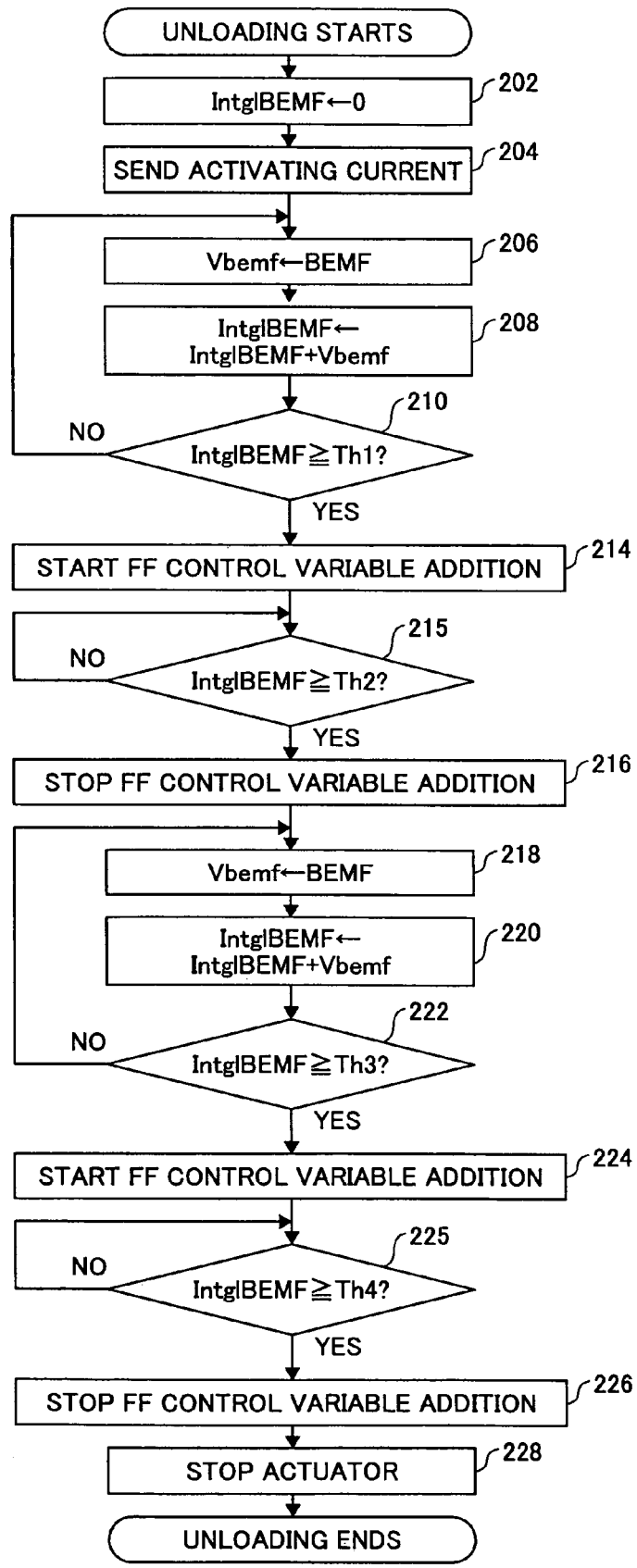
FIG. 15 is a flowchart showing the method of movement control of the actuator 14 in the operation of unloading the magnetic head 12 according to the third embodiment.

FIG. 15 is a flowchart showing the method of movement control of the actuator 14 in the operation of unloading the magnetic head 12 according to the present embodiment.

Figure 16:
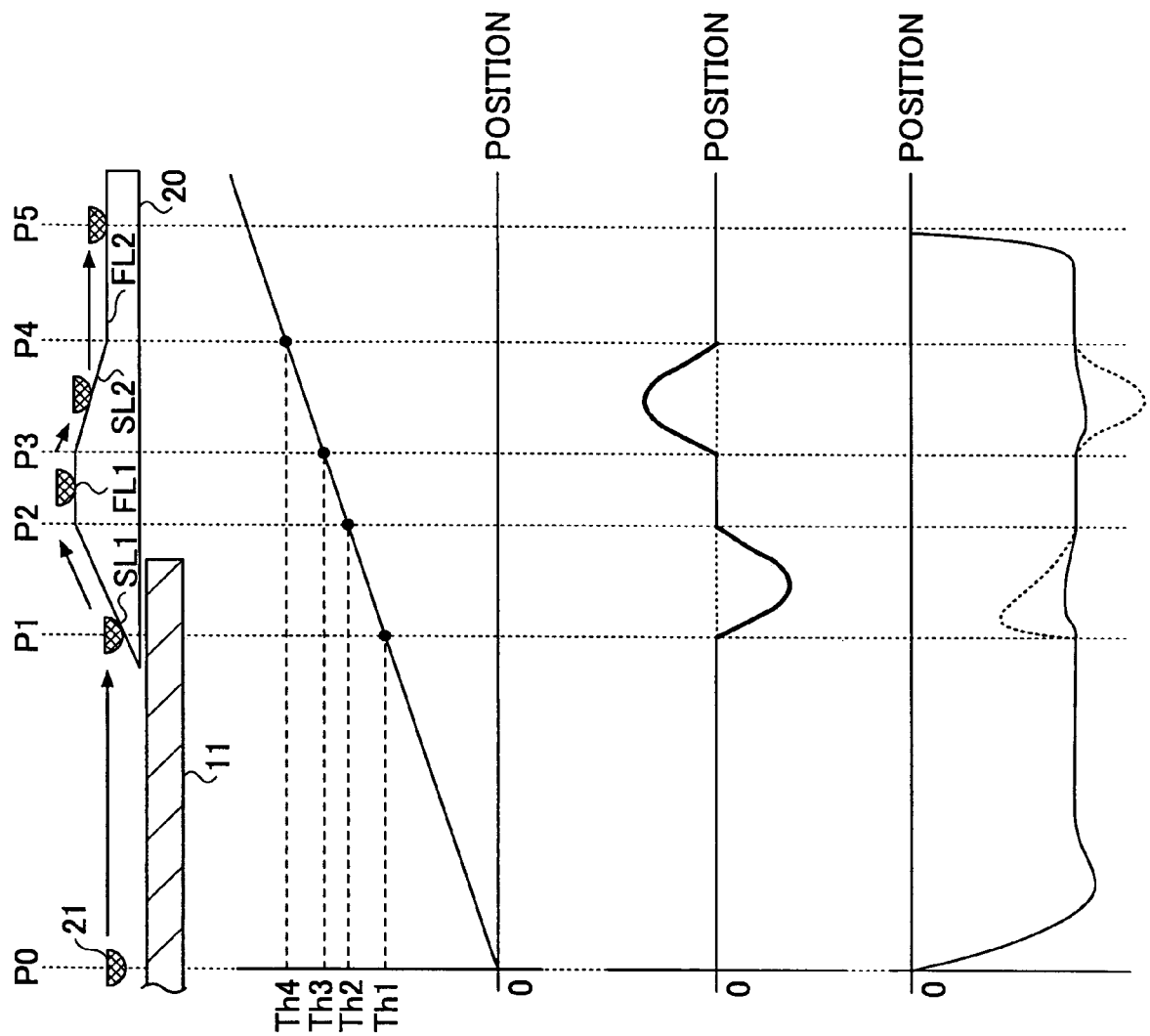
FIG. 16A is a cross-sectional view of a portion of the magnetic disk device 10 along the line indicated by the arrows X in FIG. 5, schematically showing a sequence of positions of the lift tab 21 in the operation of unloading the magnetic head 12 according to the third embodiment.
FIG. 16B is a graph showing correspondence of the integration of the BEMF (IntglBEMF) and the position thresholds Th1 through Th4 with the position of the lift tab 21 in the operation of unloading the magnetic head 12 according to the third embodiment.
FIG. 16C is a graph showing the feed-forward control variable set based on the sequence of positions of the lift tab 21 in the operation of unloading the magnetic head 12 according to the third embodiment.
FIG. 16D is a graph showing the speed of the magnetic head 12 changing with the position of the lift tab 21 in the operation of unloading the magnetic head 12 according to the third embodiment.

FIG. 16A is a cross-sectional view of a portion of the magnetic disk device 10 along the line indicated by the arrows X in FIG. 5, schematically showing a sequence of positions of the lift tab 21 in the operation of unloading the magnetic head 12 according to the present embodiment.

FIG. 16B is a graph showing correspondence of the integration of the BEMF (IntglBEMF) and the position thresholds Th1 through Th4 with the sequence of positions of the lift tab 21 in the operation of unloading the magnetic head 12 according to the present embodiment.

FIG. 16C is a graph showing a relation between the feed-forward control variable and the sequence of positions of the lift tab 21 in the operation of unloading the magnetic head 12 according to the present embodiment.

FIG. 16D is a graph showing a relation between the speed of the magnetic head 12 and the sequence of positions of the lift tab 21 in the operation of unloading the magnetic head 12 according to the present embodiment.

Referring to FIG. 15, in step 202, receiving an unloading command from the HDC 33 in FIG. 4, MPU 38 in the controller 31 sets the integration of the BEMF value (IntglBEMF) to zero.

Here, the bandwidth of the PI controller 46 is set to the usual bandwidth. It is assumed that the magnetic head 12 is on the outermost cylinder of the magnetic disk 11, that is, the reference position is the position of the outermost cylinder of the magnetic disk 11.

If the magnetic head 12 is at positions other than the outermost cylinder of the magnetic disk 11 when the unloading command is received, as already shown with reference to FIG. 8, the magnetic head 12 is moved to the outermost cylinder of the magnetic disk 11 as a usual seek operation before step 202.

In step 204, in order to drive the actuator 14 to move, MPU 38 sends an activating current to the voice coil motor 16 through the VCM driving circuit 35. The magnitude of the activating current is adjusted to a specified value by a feedback control.

In step 206, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 208, the position detection unit 48 accumulates the parameter Vbemf to IntgBEMF to continue integration of BEMF.

In step 210, the position determination unit 49 determines whether the integration of BEMF (IntglBEMF) is greater than or equal to the position threshold TH1. If the integration of BEMF is less than the position threshold TH1, step 206 through step 210 are repeated to move the actuator 14 on at a target speed until the integration of BEMF (IntglBEMF) becomes equal to the position threshold TH1.

If the integration of BEMF (IntglBEMF) is greater than or equal to the position threshold TH1, the routine proceeds to step 214.

In step 214, the position determination unit 49 in FIG. 13 sends a counting start signal to the clock counter 52 in the feed-forward controller 51. Based on the time counted by the clock counter 52, the feed-forward control variable reader 54 reads out a feed-forward control variable from the first table shown in FIG. 14A. The feed-forward control variable obtained by the feed-forward control variable reader 54 is superposed on the feedback control variable from the PI controller 46, as shown in FIG. 16C.

As shown in FIG. 16A and FIG. 16B, equality of the integration of BEMF (IntglBEMF) and the position threshold TH1 indicates that the lift tab 21 reaches the position P1, where the lift tab 21 is nearly in contact with the ramp 20.

As described above, in the related art, the speed decrease is detected when the lift tab 21 comes into contact with the ramp 20, and the feed-forward control variable is superposed based on the detection results. In contrast, in the present control method, as shown in FIG. 16C, the feed-forward control variable is superposed based on positions, therefore, the time delay of superposition can be suppressed. Especially, as shown by the solid line in FIG. 16D, the notable speed drop (shown by the dashed line in FIG. 16D) of the actuator 14 after contact with the ramp 20 occurring in the related art can be effectively suppressed.

Data in the first feed-forward control variable table may be obtained by numeric simulations, or by measurement of each magnetic disk device product in a quality check process before shipment. Since the feed-forward control variable can be determined taking into account influence of friction between and uncertainties of the ramp 20 and the lift tab 21 in each magnetic disk device product, it is possible to achieve uniform operation of the actuator 14.

Data in the second feed-forward control variable table in FIG. 14B can be determined in a similar way.

In step 215, while the feed-forward control variable is being superposed, the lift tab 21 ascends the slope SL1.

During the movement of the actuator 14, the position determination unit 49 determines whether the integration of BEMF (IntglBEMF) is greater than or equal to the position threshold TH2. If the integration of BEMF (IntglBEMF) is greater than or equal to the position threshold TH2, the routine proceeds to step 216.

In step 216, superposition of the feed-forward control variable is completed.

In step 218, while the actuator 14 is moving on, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 220, the position detection unit 48 accumulates the parameter Vbemf to IntgBEMF to continue integration of BEMF during and after superposition of the feed-forward control variable.

In step 222, the position determination unit 49 determines whether the integration of BEMF (IntglBEMF) is greater than or equal to the position threshold TH3. If the integration of BEMF is less than the position threshold TH3, step 218 through step 222 are repeated to move the actuator 14 on at the target speed until the integration of BEMF (IntglBEMF) becomes equal to the position threshold TH3.

If the integration of BEMF (IntglBEMF) is greater than or equal to the position threshold TH3, the routine proceeds to step 224.

In step 224, the position determination unit 49 in FIG. 13 sends a counting start signal to the clock counter 52 in the feed-forward controller 51. Based on the time counted by the clock counter 52, the feed-forward control variable reader 54 reads out a feed-forward control variable from the first table shown in FIG. 14B. The feed-forward control variable obtained by the feed-forward control variable reader 54 is superposed on the feedback control variable from the PI controller 46, as shown in FIG. 16C.

As shown in FIG. 16A and FIG. 16B, equality of the integration of BEMF (IntglBEMF) and the position threshold TH3 indicates that the lift tab 21 reaches the position P3, that is, the lift tab 21 reaches the boundary of the flat portion FL1 and the slope SL2.

In the present control method, corresponding to an otherwise further negative increase of the speed (the dashed line in FIG. 16D at position P3), a positive feed-forward variable is superposed as shown in FIG. 16C so as to positively decrease the speed (the solid line in FIG. 16D at position P3). At the same time, the feed-forward control variable is superposed based on positions of the actuator 14 as shown in FIG. 16C. Therefore, the time delay of superposition can be suppressed, and deviation of the moving speed of the actuator 14 from the target speed can be more effectively suppressed than in the related art.

In step 225, while the feed-forward control variable is being superposed, the lift tab 21 descends the slope SL2 of the ramp 20.

During the movement of the actuator 14, the position determination unit 49 determines whether the integration of BEMF (IntglBEMF) is greater than or equal to the position threshold TH4. If the integration of BEMF (IntglBEMF) is greater than or equal to the position threshold TH4, the routine proceeds to step 226.

In step 226, superposition of the feed-forward control variable is completed.

In step 228, with the actuator 14 being at the target speed, the base portion 14a of the actuator 14 is brought into contact with the outer stopper 22, and the actuator 14 is stopped mechanically. Alternatively, as in the first embodiment, the actuator 14 may also be stopped by setting the target speed and the InfglBEMF to zero.

The method of movement control of the actuator 14 in the operation of loading the magnetic head 12 according to the present embodiment is similar to the method described above. Specifically, with the position thresholds Th11 and Th13 as the starting points of superposition, which are defined in the description of the actuator movement control method of the first embodiment, a feed-forward control variable can be superposed by using the feed-forward control variable table used in the above description but with time order of the table reversed.

In the method for actuator movement control in the operations of loading and unloading the magnetic head 12 according to the present embodiment, with the outermost cylinder as a reference position, the position detection unit 48 calculates the present position of the lift tab 21 based on the BEMF value sent from the back electromotive force detection circuit 36, and determines whether the present position of the lift tab 21 equals specified positions P1 through P3, and based on the determination results, a feed-forward control variable is superposed. Therefore, it is possible to superpose a feed-forward control variable before or during a change of the moving speed of the actuator, for example, a rapid drop of the moving speed, thus enabling rapid suppression of fast change of the speed. Meanwhile, in a region where the speed change of the actuator 14 is small, the feed-forward control variable is set to zero, and thereby stability of speed control can be improved.

In the speed control system of the present embodiment, the clock generator 53 in FIG. 13 may also be placed outside MPU 38, and clock signals from other circuits, such as HDC 33 as shown in FIG. 4, may also be used.

The position thresholds Th1, Th2, Th3, and Th4 may also be modified to position thresholds Th1a, Th2a, Th3a, and Th4a, respectively, as described in the second embodiment. By setting the position thresholds in this way, it is possible to easily reduce the delay of feed-forward control variable superposition caused by noise occurring in the integration of the BEMF (IntglBEMF) corresponding to the moving speed of the actuator 14.

In addition, instead of the feed-forward control variable tables in FIG. 14A and FIG. 14B, a feed-forward control variable table expressing a relation between a distance from a reference position and the feed-forward control variable may be used. The feed-forward control variable reader 54 in the feed-forward controller 51 may make reference to the present position of the lift tab 21 given by the position detection unit 48 in FIG. 13, read out a feed-forward control variable from the feed-forward control variable table, and output them. For example, data in the feed-forward control variable table may be set in the following way. The feed-forward control variable is set equal to zero at a position in the range from the reference to the position threshold Th1, to be the same as those in the table in FIG. 14A at a position in the range from the position threshold Th1 to the position threshold Th2, to be zero at a position in the range from the position threshold Th2 to the position threshold Th3, to be the same as those in the table in FIG. 14B at a position in the range from the position threshold Th3 to the position threshold Th4, and to be zero at a position beyond the position threshold Th4. Further, the time variable in the first table and the second table is converted to position by using the moving speed. In this way, the position determination unit 49, the clock counter 52, and the clock generator 53 may be omitted, and thereby the control process can be simplified.

Fourth Embodiment

The magnetic disk device of the present embodiment is basically the same as that of the first embodiment, except that in control of movement of an actuator, a speed change detection window signal is generated based on positions of a lift tab, and the bandwidth of a PI controller is switched when the speed change detection window signal is OPEN and the speed changes by at least a predetermined amount. Below, the same reference numbers are used for the same elements as in the previous embodiments.

Figure 17:
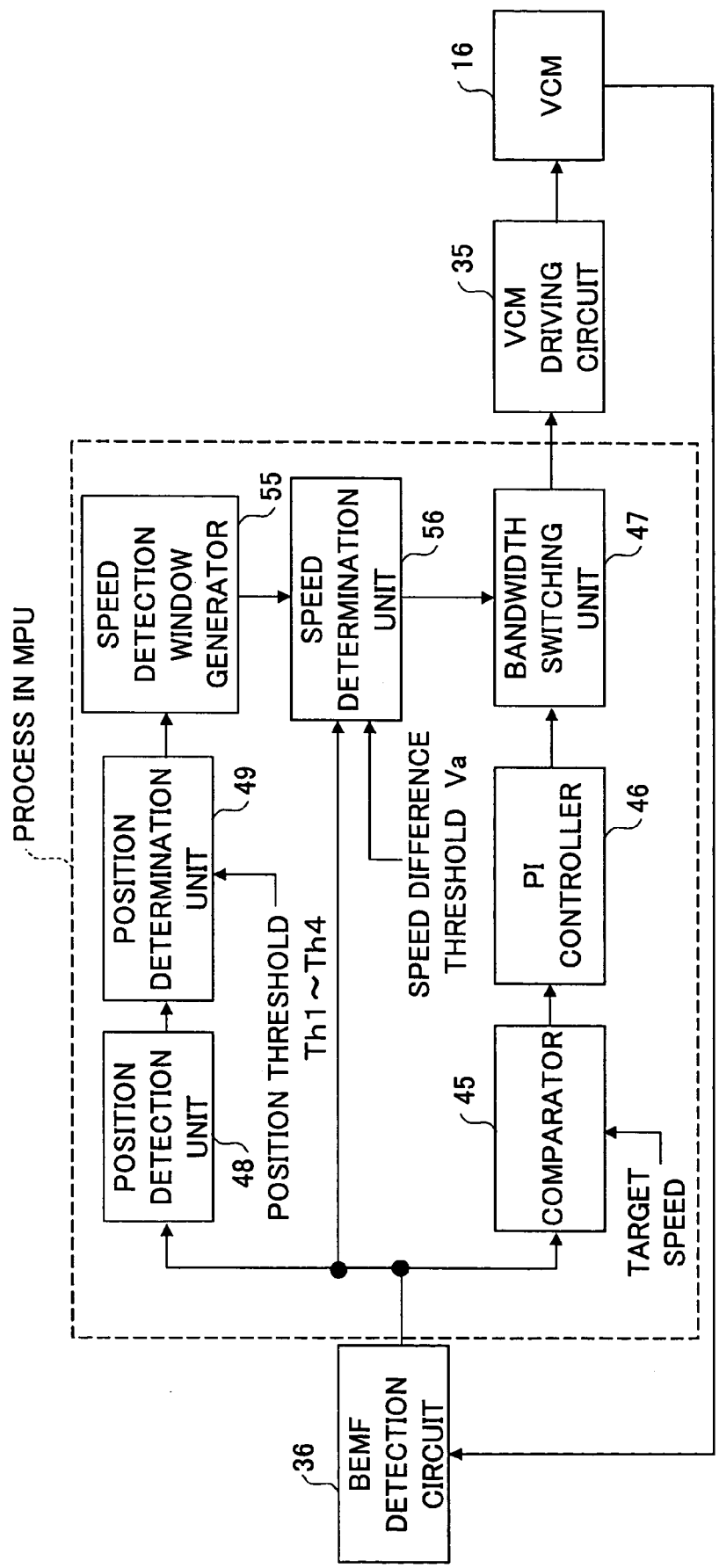
FIG. 17 is a block diagram showing a configuration of a portion of a speed control system according to a fourth embodiment, which is capable of detecting and determining speed of an actuator based on the position thereof and switching a bandwidth of a feedback speed control system according to the detection and determination results.

FIG. 17 is a block diagram showing a configuration of a portion of a speed control system according to the fourth embodiment, which is capable of detecting and determining the speed of the actuator 14 based on the position of the actuator 14 and switching the bandwidth of a feedback speed control system according to the detection and determination results.

The speed control system shown in FIG. 17 includes a comparator 45, a PI controller 46, a bandwidth switching unit 47, a position detection unit 48, a position determination unit 49, a speed detection window generator 55, and a speed determination unit 56.

The comparator 45 compares the BEMF value with a target speed stored in memory 39, and calculates the difference between them. The BEMF value, which is proportional to the moving speed of the actuator 14, is supplied by the back electromotive force detection circuit 36 connected to the voice coil motor 16. The PI controller 46 outputs a control variable to the voice coil motor 16 through the VCM driving circuit 35.

The position detection unit 48 calculates the position of the lift tab 21 based on the BEMF value supplied by the back electromotive force detection circuit 36. Based on the position of the lift tab 21, the position determination unit 49 sends a signal to the speed detection window generator 55 to set the state of the speed detection window signal OPEN or CLOSED.

When the speed detection window signal generated by the speed detection window generator 55 is OPEN, and when the difference between the speed of the actuator 14 and a target speed exceeds a threshold value, the speed determination unit 56 sends a signal to the bandwidth switching unit 47 to change the bandwidth of the PI control performed by the PI controller 46.

Specifically, the back electromotive force detection circuit 36 sends the BEMF value, which is the magnitude of the back electromotive force generated in the voice coil motor 16, to the position detection unit 48.

The position detection unit 48 integrates the BEMF value from a reference position to calculate the present position of the lift tab 21, and sends a signal indicating the present position of the lift tab 21 to the position determination unit 49.

The position determination unit 49 compares the present position of the lift tab 21 with position thresholds TH1 through TH4 stored in memory 39 in FIG. 4, and sends a speed detection window changing signal to the speed detection window generator 55 based on the determination results.

Here, for example, the reference position is the position P0 of the outermost cylinder of the magnetic disk 11 illustrated in FIG. 6. The position thresholds TH1 through TH4 are set equal to the position P1 through P4 illustrated in FIG. 6, respectively.

The speed detection window generator 55 sets the speed detection window signal OPEN or CLOSED based on the speed detection window changing signal.

The speed determination unit 56 compares the BEMF value sent from the back electromotive force detection circuit 36, indicating the present speed of the actuator 14, with the threshold value of speed difference and the target speed when the speed detection window signal is OPEN, and sends a bandwidth switching signal to the bandwidth switching unit 47 when the difference between the present speed of the actuator 14 and the target speed is greater than or equal to the threshold value of the speed difference.

The bandwidth switching unit 47 changes the bandwidth of the PI control performed by the PI controller according to the bandwidth switching signal.

Operations performed by the comparator 45, the PI controller 46, the bandwidth switching unit 47, the position detection unit 48, the position determination unit 49, the speed detection window generator 55, and the speed determination unit 56 are executed by the MPU 38 in the controller 31 shown in FIG. 4.

Below, an explanation is made of a method of movement control of the actuator 14 in the operation of unloading the magnetic head 12.

Figure 18:
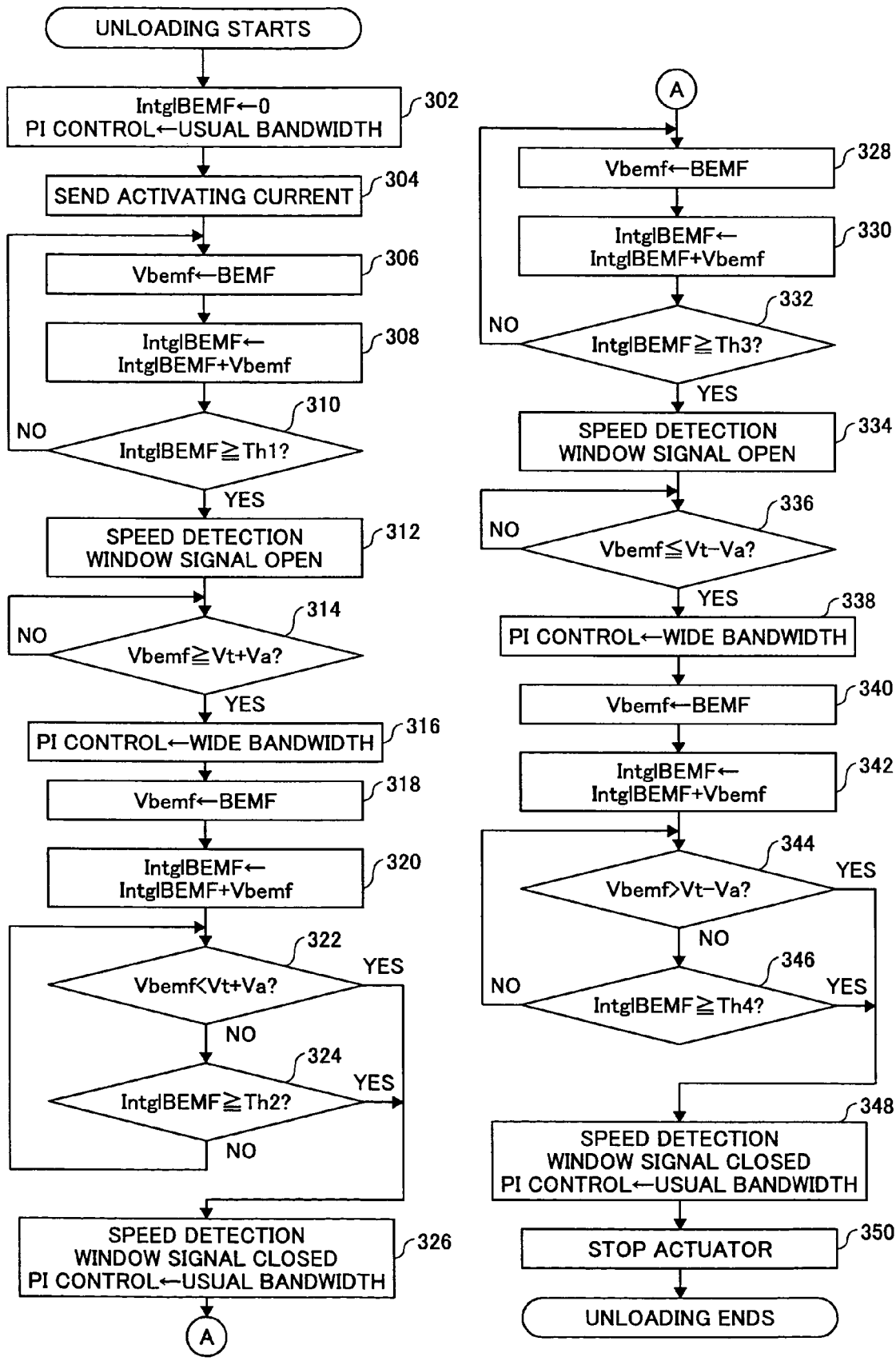
FIG. 18 is a flowchart showing the method of movement control of the actuator 14 in the operation of unloading the magnetic head 12 according to the fourth embodiment.

FIG. 18 is a flowchart showing the method of movement control of the actuator 14 in the operation of unloading the magnetic head 12 according to the present embodiment.

Figure 19:
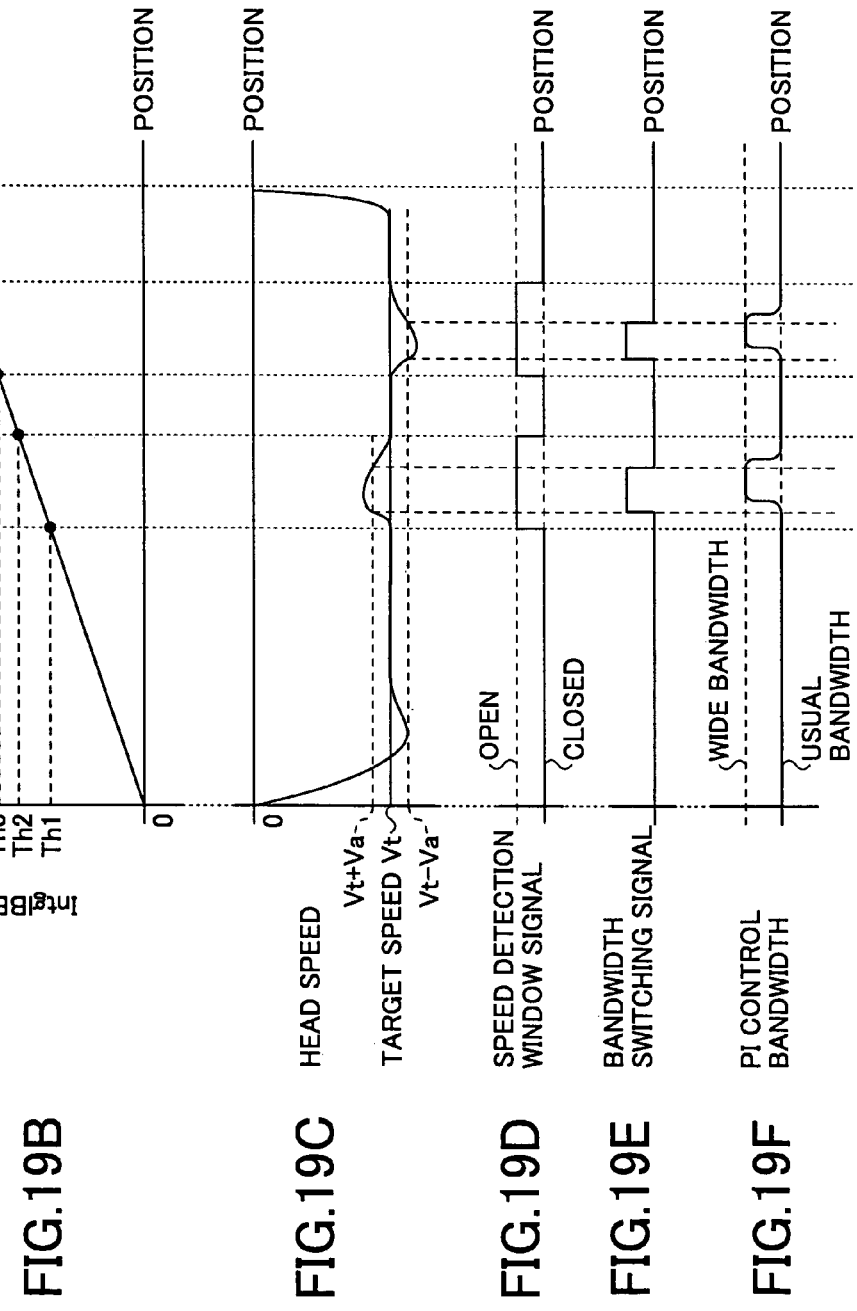
FIG. 19A is a cross-sectional view of the portion of the magnetic disk device 10 schematically showing a sequence of positions of the lift tab 21 in the operation of unloading the magnetic head 12 according to the fourth embodiment.
FIG. 19B is a graph showing the integration of the BEMF (IntglBEMF) and the position thresholds Th1 through Th4, which correspond to specified positions of the lift tab 21 in the operation of unloading the magnetic head 12 according to the fourth embodiment.
FIG. 19C is a graph showing the speed of the magnetic head 12, which changes with the position of the lift tab 21 in the operation of unloading the magnetic head 12 according to the fourth embodiment.
FIG. 19D is a graph showing a speed detection window signal in the operation of unloading the magnetic head 12 according to the fourth embodiment.
FIG. 19E is a graph showing a bandwidth switching signal in the operation of unloading the magnetic head 12 according to the fourth embodiment.
FIG. 19F is a graph showing the bandwidth of the PI control, which is set based on the position of the lift tab 21 in the operation of unloading the magnetic head 12 according to the fourth embodiment.

FIG. 19A is a cross-sectional view of the portion of the magnetic disk device 10 schematically showing a sequence of positions of the lift tab 21 in the operation of unloading the magnetic head 12 according to the present embodiment.

FIG. 19B is a graph showing the integration of the BEMF (IntglBEMF) and the position thresholds Th1 through Th4, which correspond to specified positions of the lift tab 21 in the operation of unloading the magnetic head 12 according to the present embodiment.

FIG. 19C is a graph showing the speed of the magnetic head 12, which changes with the position of the lift tab 21 in the operation of unloading the magnetic head 12 according to the present embodiment.

FIG. 19D is a graph showing the speed detection window signal in the operation of unloading the magnetic head 12 according to the present embodiment.

FIG. 19E is a graph showing the bandwidth switching signal in the operation of unloading the magnetic head 12 according to the present embodiment.

FIG. 19F is a graph showing the bandwidth of the PI control, which changes with the position of the lift tab 21 in the operation of unloading the magnetic head 12 according to the present embodiment.

Here, it is assumed that initially the magnetic head 12 is at the position P0 of the outermost cylinder of the magnetic disk 11 illustrated in FIG. 6, that is, the reference position is the position P0 of the outermost cylinder of the magnetic disk 11.

Referring to FIG. 18, in step 302, receiving an unloading command from the HDC 33, MPU 38 in the controller 31 sets the integration of the BEMF value (IntglBEMF) to zero, and the bandwidth switching unit 47 sets the PI control bandwidth to the usual bandwidth.

In step 304, MPU 38 sends an activating current to the voice coil motor 16 to drive the actuator 14 to move.

In step 306, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 308, the position detection unit 48 accumulates the parameter Vbemf to IntgBEMF to continue integration of BEMF.

In step 310, the position determination unit 49 determines whether the integration of BEMF (IntglBEMF) is greater than or equal to the position threshold TH1. If the integration of BEMF is less than the position threshold TH1, step 306 through step 310 are repeated to move the actuator 14 on at a target speed until the integration of BEMF (IntglBEMF) becomes equal to the position threshold TH1.

If the integration of BEMF (IntglBEMF) is greater than or equal to the position threshold TH1, the routine proceeds to step 312.

In step 312, the position determination unit 49 sends the speed detection window changing signal to the speed detection window generator 55. Based on the speed detection window changing signal, the speed detection window generator 55 sets the speed detection window signal to a high level, that is, to the OPEN state, as shown in FIG. 19D.

In step 314, the speed determination unit 56 determines whether the parameter Vbemf, the present speed of the actuator 14, is greater than or equal to a sum of the target speed Vt and the threshold (Va) of the speed difference.

If the parameter Vbemf is less than the sum of the target speed Vt and the threshold Va, the actuator 14 moves on with the usual bandwidth mode being maintained. Here, it is assumed that the threshold Va of the speed difference is positive.

If the parameter Vbemf is greater than or equal to the sum of the target speed Vt and the threshold Va, as shown in FIG. 19C, the routine proceeds to step 316.

In step 316, as shown in FIG. 19E, the speed determination unit 56 sends the bandwidth switching signal to the bandwidth switching unit 47. Then, as shown in FIG. 19F, the bandwidth switching unit 47 sets the PI control bandwidth to the wide bandwidth.

As described above, determination concerning the speed is performed only when the speed change detection window signal is OPEN, therefore, by setting a smaller threshold Va of the speed difference than in the related art, it is possible to rapidly detect a speed change with high sensitivity. As a result, it is possible to more effectively suppress the speed change than in the related art, and the notable speed drop of the actuator 14 after contact with the ramp 20 occurring in the related art can be effectively suppressed.

In step 318, while the actuator 14 is moving on, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 320, the position detection unit 48 accumulates the parameter Vbemf to IntgBEMF to continue integration of BEMF.

In step 322, the speed determination unit 56 determines whether the parameter Vbemf (present speed of the actuator 14) is less than the sum of the target speed Vt and the threshold Va of the speed difference.

If the parameter Vbemf is less than the sum of the target speed Vt and the threshold Va (as shown in FIG. 19C), the routine proceeds to step 326.

If the parameter Vbemf is not less than the sum of the target speed Vt and the threshold Va, the routine proceeds to step 324.

In step 324, the position determination unit 49 determines whether the integration of BEMF (IntglBEMF) is greater than or equal to the position threshold TH2. If the integration of BEMF is less than the position threshold TH2, step 322 and step 324 are repeated to move the actuator 14 on at the target speed until the integration of BEMF (IntglBEMF) becomes equal to the position threshold TH2.

If the integration of BEMF (IntglBEMF) is greater than or equal to the position threshold TH2, the routine proceeds to step 326.

In step 326, the position determination unit 49 sends the speed detection window changing signal to the speed detection window generator 55. Based on the speed detection window changing signal, the speed detection window generator 55 sets the speed detection window signal to a low level, that is, to the CLOSED state, as shown in FIG. 19D.

Then, the speed determination unit 56 changes the level of the bandwidth switching signal (in FIG. 19E), and the bandwidth switching unit 47 switches the PI control bandwidth to the usual bandwidth, as shown in FIG. 19F.

As described above, when the lift tab 21 come into contact with the ramp 20 and ascends the slope SL1, the bandwidth switching unit 47 switches the PI control bandwidth to the wide bandwidth only when the speed of the actuator 14 changes by an amount greater than the threshold value Va of the speed difference. In doing so, switching to the wide bandwidth is performed only when a rapid speed change occurs and the usual bandwidth mode cannot compensate. Therefore, it is possible to achieve both high responding performance and high control stability.

In step 328, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 330, the position detection unit 48 accumulates the parameter Vbemf to IntgBEMF to continue integration of BEMF.

In step 332, the position determination unit 49 determines whether the integration of BEMF (IntglBEMF) is greater than or equal to the position threshold TH3. If the integration of BEMF is less than the position threshold TH3, step 328 through step 330 are repeated to move the actuator 14 on at the target speed until the integration of BEMF (IntglBEMF) becomes equal to the position threshold TH3.

If the integration of BEMF (IntglBEMF) is greater than or equal to the position threshold TH3, the routine proceeds to step 334.

In step 334, the position determination unit 49 sends the speed detection window changing signal to the speed detection window generator 55. Corresponding to the speed detection window changing signal, the speed detection window generator 55 sets the speed detection window signal to a high level (OPEN state), as shown in FIG. 19D.

In step 336, the speed determination unit 56 determines whether the parameter Vbemf, the present speed of the actuator 14, is less than or equal to a difference between the target speed Vt and the threshold Va of the speed difference.

If the parameter Vbemf is greater than the difference between the target speed Vt and the threshold Va, the actuator 14 moves on with the usual bandwidth mode being maintained.

If the parameter Vbemf is less than or equal to the difference between the target speed Vt and the threshold Va, as shown in FIG. 19C, the routine proceeds to step 336.

In step 338, as shown in FIG. 19E, the speed determination unit 56 sets the bandwidth switching signal to the high level, accordingly, as shown in FIG. 19F, the bandwidth switching unit 47 sets the PI control bandwidth to the wide bandwidth.

In step 340, while the actuator 14 is moving on, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 342, the position detection unit 48 accumulates the parameter Vbemf to IntgBEMF to continue integration of BEMF.

In step 344, the speed determination unit 56 determines whether the parameter Vbemf (present speed of the actuator 14) is less than the difference between the target speed Vt and the threshold Va of the speed difference.

If the parameter Vbemf is less than the difference between the target speed Vt and the threshold Va (as shown in FIG. 19C), the routine proceeds to step 348.

If the parameter Vbemf is not less than the difference between the target speed Vt and the threshold Va, the routine proceeds to step 346.

In step 346, the position determination unit 49 determines whether the integration of BEMF (IntglBEMF) is greater than or equal to the position threshold TH4. If the integration of BEMF is less than the position threshold TH4, step 344 through step 346 are repeated to move the actuator 14 on at the target speed until the integration of BEMF (IntglBEMF) becomes equal to the position threshold TH4.

If the integration of BEMF (IntglBEMF) is greater than or equal to the position threshold TH4, the routine proceeds to step 348.

In step 348, the position determination unit 49 sends the speed detection window changing signal to the speed detection window generator 55. Based on the speed detection window changing signal, the speed detection window generator 55 sets the speed detection window signal to a low level, that is, to the CLOSED state, as shown in FIG. 19D. Accordingly, the speed determination unit 56 changes the level of the bandwidth switching signal (in FIG. 19E), and the bandwidth switching unit 47 switches the PI control bandwidth to the usual bandwidth, as shown in FIG. 19F.

As described above, when the lift tab 21 descends the slope SL2 of the ramp 20, the bandwidth switching unit 47 switches the PI control bandwidth to the wide bandwidth only when the speed of the actuator 14 changes by an amount greater than the threshold value Va of the speed difference. In doing so, switching to the wide bandwidth is performed only when a rapid speed change occurs and the usual bandwidth mode cannot compensate. Therefore, it is possible to achieve both high responding performance and high control stability.

It should be noted that step 328 through step 348 for speed control on the slope SL2 are not indispensable. These steps may be executed only when otherwise speed control becomes unstable.

In step 350, as described in the first embodiment, the actuator 14 may be stopped by changing setting of the target speed. Alternatively, the actuator 14 may be mechanically stopped by using the outer stopper 22, specifically, when the base portion 14a of the actuator 14 mechanically contacts the outer stopper 22, the actuator 14 is stopped.

So at this point, the unloading operation is completed.

The method for movement control of the actuator 14 in loading the magnetic head 12 according to the present embodiment is similar to the method described above. Specifically, the actuator movement control method for loading operation can be achieved by combining the corresponding method in the first embodiment and the method described above.

In the method for actuator movement control according to the present embodiment in the operations of loading and unloading the magnetic head 12, speed determination is performed only when the speed change detection window signal, which depends on the position of the lift tab 21, is OPEN, and the bandwidth switching unit 47 switches the bandwidth of the PI control according to the determination result. Because the speed change detection window signal is set OPEN depending on the position of the lift tab 21, during normal seek operations or in regions where high responding performance is not required, it is possible to prevent operation of erroneously switching PI control to the wide bandwidth in speed control due to speed changes caused by external shock and vibration, thereby enabling stable speed control.

In addition, because the threshold Va of the speed difference, which is used in speed determination, can be set small, it is possible to rapidly detect a speed change with high sensitivity. As a result, it is possible to effectively suppress the speed drop of the actuator after contact with the ramp.

Fifth Embodiment

The magnetic disk device of the fifth embodiment is basically the same as that of the fourth embodiment, except that in control of movement of an actuator when loading and unloading a magnetic head, instead of switching bandwidth of a PI controller corresponding to determination of a speed change, a feed-forward control variable is superposed on a control variable of the feedback speed control system.

Below, the same reference numbers are used for the same elements as in the previous embodiment.

Figure 20:
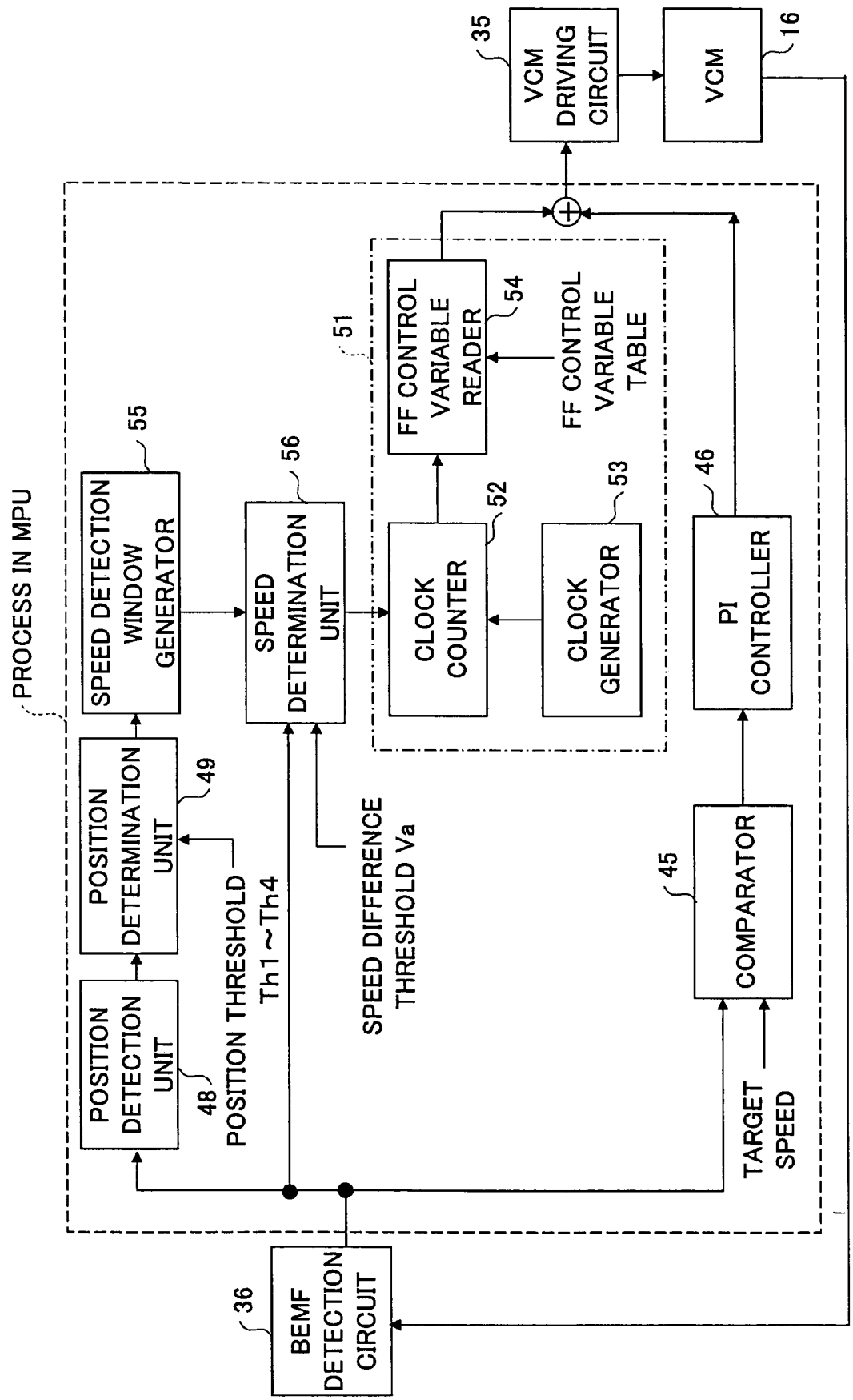
FIG. 20 is a block diagram showing a configuration of a portion of a speed control system according to a fifth embodiment, which is capable of detecting and determining the speed of the an actuator based on the position of the actuator and superposing a feed-forward control variable on a feedback speed control variable of a feedback speed control system.

FIG. 20 is a block diagram showing a configuration of a portion of a speed control system according to the fifth embodiment, which is capable of detecting and determining the speed of the actuator 14 based on the position of the actuator 14 and superposing a feed-forward control variable on a feedback speed control variable of a feedback speed control system.

The speed control system shown in FIG. 20 includes a comparator 45, a PI controller 46, a feed-forward controller 51, a position detection unit 48, a position determination unit 49, a speed detection window generator 55, and a speed determination unit 56.

The feed-forward controller 51 includes a clock counter 52, a clock generator 53, and a feed-forward control variable reader 54.

As shown in FIG. 20, instead of the bandwidth switching unit 47 for switching the bandwidth of the PI control as shown in FIG. 17 in the fourth embodiment, the speed control system of the present embodiment includes a feed-forward controller 51 for superposing a feed-forward control variable on a control variable of a feedback speed control system.

In the speed control system of the present embodiment, the comparator 45 compares the BEMF value, which is proportional to the moving speed of the actuator 14, with a target speed stored in memory 39, and calculates the difference between them. The PI controller 46 outputs a control variable to the voice coil motor 16 through the VCM driving circuit 35. The position detection unit 48 calculates the position of the lift tab 21 based on the BEMF value supplied by the back electromotive force detection circuit 36. Based on the position of the lift tab 21, the position determination unit 49 sends a signal to the speed detection window generator 55 to set the state of the speed detection window signal OPEN or CLOSED. When the speed detection window signal generated by the speed detection window generator 55 is OPEN, and when a difference between the speed of the actuator 14 and a target speed exceeds a threshold value, the speed determination unit 56 sends a counting start signal to the clock counter 52 in the feed-forward controller 51, and the feed-forward control variable reader 54 reads out a feed-forward control variable from a feed-forward control variable table loaded in the memory 39. The feed-forward control variable from the feed-forward control variable reader 54 is superposed on the feedback control variable from the PI controller 46, and the sum is used to control the voice coil motor 16 via the VCM driving circuit 35.

Specifically, the back electromotive force detection circuit 36 sends the BEMF value, which is the magnitude of the back electromotive force generated in the voice coil motor 16, to the position detection unit 48.

The position detection unit 48 integrates the BEMF value from a reference position to calculate the present position of the lift tab 21, and sends a signal indicating the present position of the lift tab 21 to the position determination unit 49.

The position determination unit 49 compares the present position of the lift tab 21 with position thresholds TH1 through TH4 stored in memory 39 in FIG. 4, and sends a speed detection window changing signal to the speed detection window generator 55 based on the determination results. For example, the reference position is the position P0 of the outermost cylinder of the magnetic disk 11 illustrated in FIG. 6. The position thresholds TH1 through TH4 are set equal to the position P1 through P4 illustrated in FIG. 6, respectively.

The speed detection window generator 55 sets the speed detection window signal OPEN or CLOSED based on the speed detection window changing signal.

The speed determination unit 56 compares the BEMF value sent from the back electromotive force detection circuit 36, indicating the present speed of the actuator 14, with the threshold value of speed difference and the target speed when the speed detection window signal is OPEN, and sends the counting start signal to start the clock counter 52 when the difference between the present speed of the actuator 14 and the target speed is greater than or equal to the threshold value of the speed difference.

Based on the time counted by the clock counter 52, the feed-forward control variable reader 54 reads out a feed-forward control variable from feed-forward control variable tables, for example, the tables shown in FIG. 14A or FIG. 14B. The feed-forward control variable from the feed-forward control variable reader 54 is superposed on the feedback control variable from the PI controller 46, and the sum is used to control the voice coil motor 16 via the VCM driving circuit 35.

Operations performed by the comparator 45, the PI controller 46, the position detection unit 48, the position determination unit 49, clock counter 52, a clock generator 53, a feed-forward control variable reader 54, the speed detection window generator 55, and the speed determination unit 56 are executed by the MPU 38 in the controller 31 shown in FIG. 4.

Below, an explanation is made of a method for controlling movement of the actuator 14 in the operation of unloading the magnetic head 12 according to the present embodiment.

Figure 21:
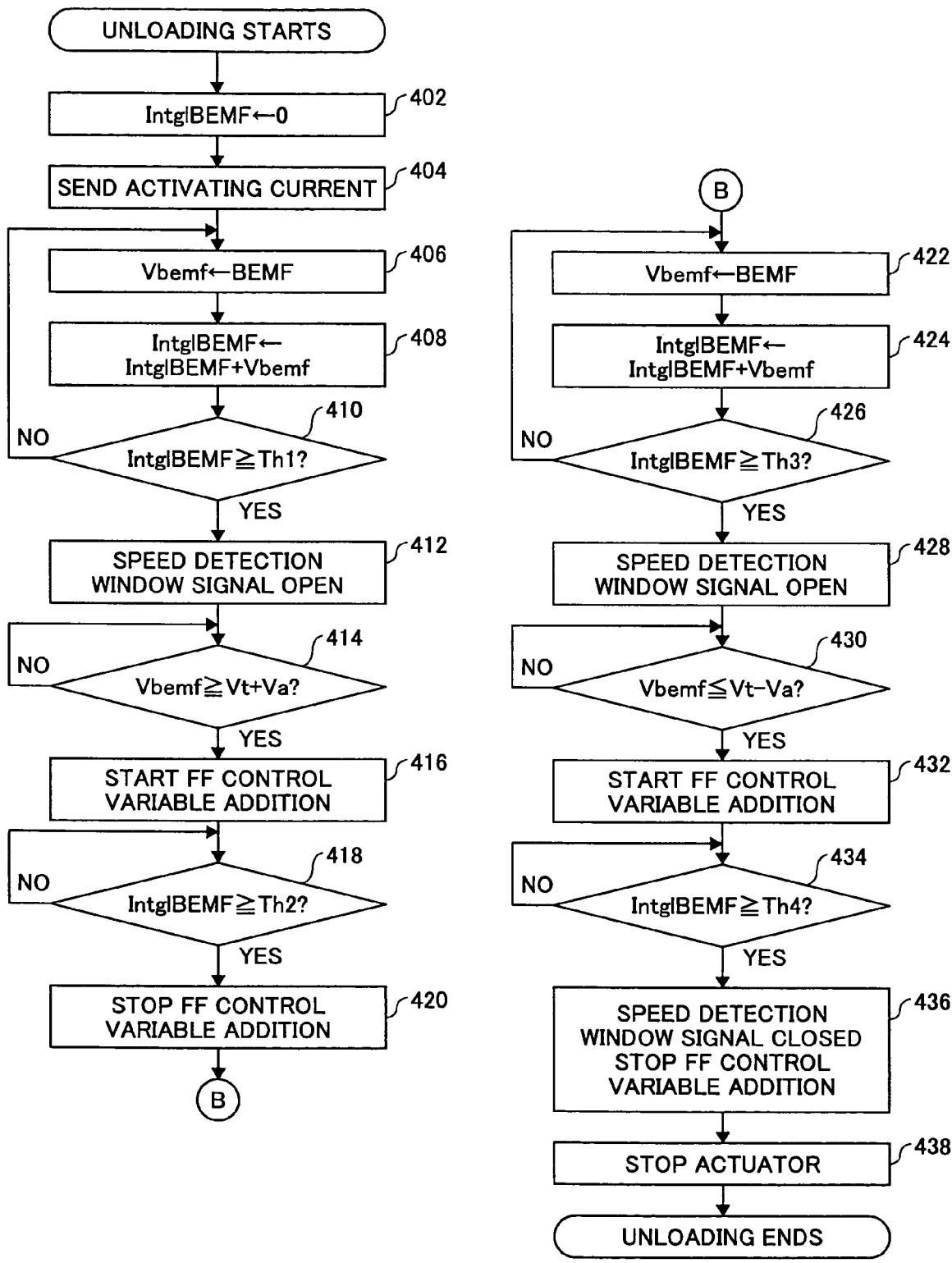
FIG. 21 is a flowchart showing the method of movement control of the actuator 14 in the operation of unloading the magnetic head 12 according to the fifth embodiment.

FIG. 21 is a flowchart showing the method of movement control of the actuator 14 in the operation of unloading the magnetic head 12 according to the present embodiment.

FIG. 22A is a cross-sectional view of the portion of the magnetic disk device 10 schematically showing a sequence of positions of the lift tab 21 in the operation of unloading the magnetic head 12 according to the present embodiment.

FIG. 22B is a graph showing the integration of the BEMF (IntglBEMF) and the position thresholds Th1 through Th4, which correspond to specified positions of the lift tab 21 in the operation of unloading the magnetic head 12 according to the present embodiment.

FIG. 22C is a graph showing the speed of the magnetic head 12, which changes with the position of the lift tab 21 in the operation of unloading the magnetic head 12 according to the present embodiment.

FIG. 22D is a graph showing the speed detection window signal in the operation of unloading the magnetic head 12 according to the present embodiment.

FIG. 22E is a graph showing the counting start signal in the operation of unloading the magnetic head 12 according to the present embodiment.

FIG. 22F is a graph showing the feed-forward control variable, which changes with the position of the lift tab 21 in the operation of unloading the magnetic head 12 according to the present embodiment.

Here, it is assumed that initially the magnetic head 12 is at the position P0 of the outermost cylinder of the magnetic disk 11 illustrated in FIG. 6, that is, the reference position is the position P0 of the outermost cylinder of the magnetic disk 11.

Referring to FIG. 21, in step 402, receiving an unloading command from the HDC 33, MPU 38 in the controller 31 sets the integration of the BEMF value (IntglBEMF) to zero. Here, it is assumed that the bandwidth switching unit 47 sets the PI control bandwidth to the usual bandwidth.

In step 404, MPU 38 sends an activating current to the voice coil motor 16 to drive the actuator 14 to move.

In step 406, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 408, the position detection unit 48 accumulates the parameter Vbemf to IntglBEMF to continue integration of BEMF.

In step 410, the position determination unit 49 determines whether the integration of BEMF (IntglBEMF) is greater than or equal to the position threshold TH1. If the integration of BEMF is less than the position threshold TH1, step 406 through step 410 are repeated to move the actuator 14 on at a target speed until the integration of BEMF (IntglBEMF) becomes equal to the position threshold TH1.

If the integration of BEMF (IntglBEMF) is greater than or equal to the position threshold TH1, the routine proceeds to step 412.

In step 412, the position determination unit 49 sends the speed detection window changing signal to the speed detection window generator 55. Based on the speed detection window changing signal, the speed detection window generator 55 sets the speed detection window signal to a high level, that is, to OPEN state, as shown in FIG. 22D.

In step 414, the speed determination unit 56 determines whether the parameter Vbemf, the present speed of the actuator 14, is greater than or equal to a sum of the target speed Vt and the threshold (Va) of the speed difference.

If the parameter Vbemf is less than the sum of the target speed Vt and the threshold Va, the actuator 14 moves on. Here, it is assumed that the threshold Va of the speed difference is positive.

If the parameter Vbemf is greater than or equal to the sum of the target speed Vt and the threshold Va, as shown in FIG. 22C, the routine proceeds to step 416.

In step 416, as shown in FIG. 22E, the speed determination unit 56 sends the counting start signal to the clock counter 52 in the feed-forward controller 51. Based on the time counted by the clock counter 52, the feed-forward control variable reader 54 reads out a feed-forward control variable (as shown in FIG. 22F) from a feed-forward control variable table, for example that shown in FIG. 14A. The feed-forward control variable obtained by the feed-forward control variable reader 54 is superposed on the feedback control variable from the PI controller 46.

Due to superposition of the feed-forward control variable on the feedback control variable for the actuator 14, the lift tab 21 is moved to ascend the slope SL1 of the ramp 20.

During superposition of the feed-forward control variable on the feedback control variable, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf. The position detection unit 48 accumulates the parameter Vbemf to IntglBEMF to continue integration of BEMF.

As described above, determination concerning the speed is performed only when the speed change detection window signal is OPEN, which depends on the position of the lift tab 21, and the feed-forward controller 51 superposes the feed-forward control variable on a feedback control variable according to the determination result. Therefore, during normal seek operations or in regions where high responding performance is not required, it is possible to prevent operation of erroneously superposing a feed-forward control variable on a feedback control variable due to speed changes caused by external shock and vibration, and thereby enabling stable speed control.

In step 418, the position determination unit 49 determines whether the integration of BEMF (IntglBEMF) is greater than or equal to the position threshold TH2. If the integration of BEMF is less than the position threshold TH2, superposition of the feed-forward control variable on the feedback control variable is continued to move the actuator 14 on at the target speed until the integration of BEMF (IntglBEMF) becomes equal to the position threshold TH2.

If the integration of BEMF (IntglBEMF) is greater than or equal to the position threshold TH2, the routine proceeds to step 420.

In step 420, superposition of the feed-forward control variable is completed.

Also after superposition of the feed-forward control variable on the feedback control variable, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf. The position detection unit 48 accumulates the parameter Vbemf to IntglBEMF to continue integration of BEMF.

When the lift tab 21 descends the slope SL2 of the ramp 20, similarly, the speed detection window signal is set OPEN depending on the position of the lift tab 21, and after speed determination, a feed-forward control variable is superposed on a feedback control variable. This process is described by the following steps.

In step 422, the back electromotive force detection circuit 36 detects the back electromotive force generated in the voice coil motor 16 due to movement of the actuator 14, and the position detection unit 48 assigns the detected magnitude of the back electromotive force (BEMF) to the parameter Vbemf.

In step 424, the position detection unit 48 accumulates the parameter Vbemf to IntglBEMF to continue integration of BEMF.

In step 426, the position determination unit 49 determines whether the integration of BEMF (IntglBEMF) is greater than or equal to the position threshold TH3. If the integration of BEMF is less than the position threshold TH3, step 422 through step 425 are repeated to move the actuator 14 on at a target speed until the integration of BEMF (IntglBEMF) becomes equal to the position threshold TH3.

If the integration of BEMF (IntglBEMF) is greater than or equal to the position threshold TH3, the routine proceeds to step 428.

In step 428, the position determination unit 49 sends the speed detection window changing signal to the speed detection window generator 55. Based on the speed detection window changing signal, the speed detection window generator 55 sets the speed detection window signal to a high level, that is, to the OPEN state, as shown in FIG. 22D.

In step 430, the speed determination unit 56 determines whether the parameter Vbemf, the present speed of the actuator 14, is greater than or equal to a difference between the target speed Vt and the threshold Va of the speed difference.

If the parameter Vbemf is greater than the difference between the target speed Vt and the threshold Va, the actuator 14 moves on.

If the parameter Vbemf is less than or equal to the difference between the target speed Vt and the threshold Va, as shown in FIG. 22C, the routine proceeds to step 432.

In step 432, as shown in FIG. 22E, the speed determination unit 56 sends the counting start signal to the clock counter 52 in the feed-forward controller 51. Based on the time counted by the clock counter 52, the feed-forward control variable reader 54 reads out a feed-forward control variable (as shown in FIG. 22F) from a feed-forward control variable table, for example that shown in FIG. 14B. The feed-forward control variable obtained by the feed-forward control variable reader 54 is superposed on the feedback control variable from the PI controller 46.

In step 434, the position determination unit 49 determines whether the integration of BEMF (IntglBEMF) is greater than or equal to the position threshold TH4. If the integration of BEMF is less than the position threshold TH4, superposition of the feed-forward control variable on the feedback control variable is continued to move the actuator 14 on at the target speed until the integration of BEMF (IntglBEMF) becomes equal to the position threshold TH4.

If the integration of BEMF (IntglBEMF) is greater than or equal to the position threshold TH4, the routine proceeds to step 436.

In step 436, the position determination unit 49 sends the speed detection window changing signal to the speed detection window generator 55. Based on the speed detection window changing signal, the speed detection window generator 55 sets the speed detection window signal to a low level, that is, to the CLOSED state, as shown in FIG. 22D. The superposition of the feed-forward control variable is completed.

In step 438, as described in the fourth embodiment, the actuator 14 may be stopped by changing setting of the target speed. Alternatively, the actuator 14 may be mechanically stopped by using the outer stopper 22, specifically, when the base portion 14a of the actuator 14 mechanically contacts the outer stopper 22, the actuator 14 is stopped.

So at this point, the unloading operation is completed.

The method for movement control of the actuator 14 in loading the magnetic head 12 according to the present embodiment is similar to the method described above.

In the method for actuator movement control according to the present embodiment in the operations of loading and unloading the magnetic head 12, speed determination is performed only when the speed change detection window signal is OPEN, which depends on the position of the lift tab 21, and the feed-forward controller 51 superposes the feed-forward control variable on a feedback control variable according to the determination result. Therefore, during normal seek operations or in regions where high responding performance is not required, it is possible to prevent operation of erroneously superposing a feed-forward control variable on a feedback control variable due to speed changes caused by external shock and vibration, and thereby enabling stable speed control.

In addition, while the feed-forward control variable is being superposed, stable feedback control can be maintained.

Furthermore, the position thresholds Th1 through Th4 may also be modified to the position thresholds Th1a through Th4a as described in the second embodiment.

Sixth Embodiment

The magnetic disk device of the sixth embodiment is basically the same as that of the first embodiment, except that a rotary encoder or an optical scale is used to detect the position of the lift tab, instead of integrating the BEMF value, which is a back electromotive force proportional to the moving speed of the actuator 14.

Below, the same reference numbers are used for the same elements as in the previous embodiment.

Figure 23:
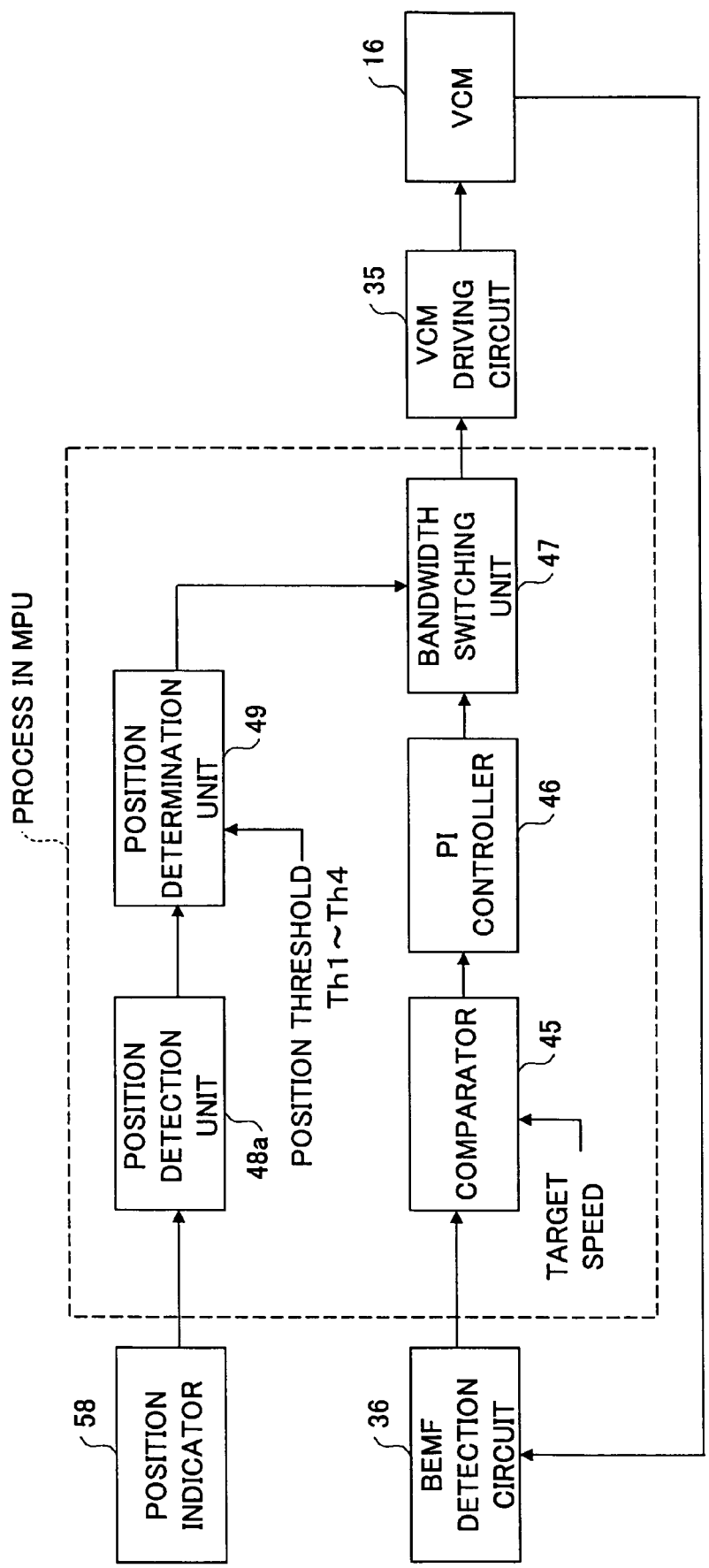
FIG. 23 is a block diagram showing a configuration of a portion of a speed control system according to a sixth embodiment, which is capable of switching a bandwidth of a feedback speed control system based on the position of a magnetic head.

FIG. 23 is a block diagram showing a configuration of a portion of a speed control system according to the sixth embodiment, which is capable of switching the bandwidth of a feedback speed control system based on the position of a magnetic head.

The speed control system shown in FIG. 23 includes a comparator 45, a PI controller 46, a bandwidth switching unit 47, a position detection unit 48a, a position determination unit 49, and a position indicator 58.

In the present embodiment, the position detection unit 48a obtains the position of the magnetic head 12 from the position indicator 58. The position indicator 58 may be a rotary encoder mounted on the rotational axis 19 of the actuator 14. Alternatively, the position indicator 58 may include an optical scale arranged on the outer coil 16a or on the inner coil 16b of the voice coil motor 16, and in addition, a detector for reading scales arranged on the side of a permanent magnet. For example, the smallest scale of the optical scale is 1 μm.

The position detection unit 48a calculates the present position of the lift tab 21 from a predetermined reference position and the indication of the position indicator 58, and sends a signal indicating the present position of the lift tab 21 to the position determination unit 49.

The position determination unit 49 compares the present position of the lift tab 21 with position thresholds TH1 through TH4 stored in memory 39 in FIG. 4, and sends a bandwidth switching signal to the bandwidth switching unit 47 based on the comparison results.

The bandwidth switching unit 47 changes the bandwidth of the PI control performed by the PI controller according to the bandwidth switching signal.

Here, for example, the reference position is the position P0 of the outermost cylinder of the magnetic disk 11 illustrated in FIG. 6. The position thresholds TH1 through TH4 are set equal to the position P1 through P4 illustrated in FIG. 6, respectively.

The other part of the magnetic disk device of the present embodiment is the same as that of the first embodiment, and the explanation is omitted.

According to the present embodiment, by using the position indicator 58 to detect the position of the lift tab 21, there are few errors caused by electrical noise that occur when easily integrating the BEMF value, and the position of the lift tab 21 can be determined accurately. Consequently, switching from the usual bandwidth to the wide bandwidth, or vise versa can be performed accurately and quickly, thereby reducing time delay in control and suppressing speed increase.

Certainly, the present embodiment may be combined with the second through sixth embodiments, and the same effects can be obtained.

While the invention is described above with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, it is described that the ramp is placed outside the outer diameter of the magnetic disk, but the ramp may also be set inside the outer diameter of the magnetic disk, and the method for actuator movement control is still applicable.

In the above embodiments, instead of the PI controller, a P (proportional) controller to a PID (proportional integration differentiation) controller may also be used.

In the above embodiments, a magnetic disk is used as the storage medium, but the present invention is not limited to this, and may be applied to any other storage media which employ the ramp load/unload technique.

Summarizing the effect of the present invention, because the moving speed of a recording and reproducing head is controlled based on the position of the recording and reproducing head, it is possible to present operation errors caused by external shock and vibration in the speed control, and at the same time, it is possible to reduce deviation of the speed of the recording and reproducing head from a target value by rapidly and stably switching the bandwidth of the feedback control. Consequently, it is possible to realize a storage device and actuator movement control method capable of highly stable operations of loading and unloading the recording and reproducing head.

This patent application is based on Japanese Priority Patent Application No. 2003-388146 filed on Nov. 18, 2003, the entire contents of which are hereby incorporated by reference.

What is claimed is:

1. A storage device, comprising:
a disk medium;
a recording and reproducing head that floats over the disk medium and records or reproduces information in the disk medium;
an actuator that supports the recording and reproducing head and moves the recording and reproducing head in a radial direction of the disk medium;
a driving unit that drives the actuator;
a speed detection unit that detects a moving speed of the actuator;
a speed control unit that controls the moving speed of the actuator by a feedback control based on a difference between a detected moving speed of the actuator and a target speed;
a ramp member arranged outside the disk medium used for loading and unloading the recording and reproducing head;
a position detection unit that detects a position of the recording and reproducing head; and
a position determination unit that determines whether the detected position of the recording and reproducing head reaches a first predetermined position in operations of loading or unloading the recording and reproducing head,
wherein
the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination.

2. A storage device comprising:
a disk medium;
a recording and reproducing head that floats over the disk medium and records or reproduces information in the disk medium;
an actuator that supports the recording and reproducing head and moves the recording and reproducing head in a radial direction of the disk medium;
a driving unit that drives the actuator;
a speed detection unit that detects a moving speed of the actuator;
a speed control unit that controls the moving speed of the actuator by a feedback control based on a difference between a detected moving speed of the actuator and a target speed;
a ramp member arranged outside the disk medium used for loading and unloading the recording and reproducing head;
a position detection unit that detects a position of the recording and reproducing head; and
a position determination unit that determines whether the detected position of the recording and reproducing head reaches a first predetermined position in operations of loading or unloading the recording and reproducing head,
wherein the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination; and
when the position determination unit determines that the position of the recording and reproducing head reaches the first predetermined position, the bandwidth switching unit switches the bandwidth of the feedback control to the wide bandwidth, or the feed-forward compensation unit adds the predetermined feed-forward control variable to the control variable of the feed-back control.

3. A storage device comprising:
a disk medium;
a recording and reproducing head that floats over the disk medium and records or reproduces information in the disk medium;
an actuator that supports the recording and reproducing head and moves the recording and reproducing head in a radial direction of the disk medium;
a driving unit that drives the actuator;
a speed detection unit that detects a moving speed of the actuator;
a speed control unit that controls the moving speed of the actuator by a feedback control based on a difference between a detected moving speed of the actuator and a target speed;

a ramp member arranged outside the disk medium used for loading and unloading the recording and reproducing head;

a position detection unit that detects a position of the recording and reproducing head; and a position determination unit that determines whether the detected position of the recording and reproducing head reaches a first predetermined position in operations of loading or unloading the recording and reproducing head, wherein the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination;

the storage device further comprising a speed change determination unit that determines whether the speed difference exceeds a predetermined value when the position determination unit determines that the position of the recording and reproducing head reaches the first predetermined position, wherein:

if the speed change determination unit determines that the speed difference exceeds the predetermined value, the bandwidth switching unit switches the bandwidth of the feedback control to the wide bandwidth, or the feed-forward compensation unit adds the predetermined feed-forward control variable to the control variable of the feed-back control.

4. A storage device comprising:

a disk medium;

a recording and reproducing head that floats over the disk medium and records or reproduces information in the disk medium;

an actuator that supports the recording and reproducing head and moves the recording and reproducing head in a radial direction of the disk medium;

a driving unit that drives the actuator;

a speed detection unit that detects a moving speed of the actuator;

a speed control unit that controls the moving speed of the actuator by a feedback control based on a difference between a detected moving speed of the actuator and a target speed;

a ramp member arranged outside the disk medium used for loading and unloading the recording and reproducing head;

a position detection unit that detects a position of the recording and reproducing head; and a position determination unit that determines whether the detected position of the recording and reproducing head reaches a first predetermined position in operations of loading or unloading the recording and reproducing head, wherein the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination;

wherein in the operation of unloading the recording and reproducing head, the first predetermined position includes a position where the recording and reproduction head is nearly in contact with the ramp member.

5. A storage device comprising:

a disk medium;

a recording and reproducing head that floats over the disk medium and records or reproduces information in the disk medium;

an actuator that supports the recording and reproducing head and moves the recording and reproducing head in a radial direction of the disk medium;

a driving unit that drives the actuator;

a speed detection unit that detects a moving speed of the actuator;

a speed control unit that controls the moving speed of the actuator by a feedback control based on a difference between a detected moving speed of the actuator and a target speed;

a ramp member arranged outside the disk medium used for loading and unloading the recording and reproducing head;

a position detection unit that detects a position of the recording and reproducing head; and a position determination unit that determines whether the detected position of the recording and reproducing head reaches a first predetermined position in operations of loading or unloading the recording and reproducing head, wherein the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination;

the ramp member including a slope portion having a surface inclined relative to a surface of the disk medium, said slope portion raising the recording and reproducing head away from the disk medium in the operation of unloading the recording and reproducing head; and a flat portion parallel to the surface of the disk medium and connected to the slope portion; wherein in the operation of loading the recording and reproducing head, the first predetermined position includes a position at a boundary of the slope portion and the flat portion.

6. A storage device comprising:

a disk medium;

a recording and reproducing head that floats over the disk medium and records or reproduces information in the disk medium;

an actuator that supports the recording and reproducing head and moves the recording and reproducing head in a radial direction of the disk medium;

a driving unit that drives the actuator;

a speed detection unit that detects a moving speed of the actuator;

a speed control unit that controls the moving speed of the actuator by a feedback control based on a difference between a detected moving speed of the actuator and a target speed;

a ramp member arranged outside the disk medium used for loading and unloading the recording and reproducing head;

a position detection unit that detects a position of the recording and reproducing head; and a position determination unit that determines whether the detected position of the recording and reproducing head reaches a first predetermined position in operations of loading or unloading the recording and reproducing head, wherein the speed control unit comprises one of a bandwidth switching unit that switches a bandwidth of the feedback control to a wide bandwidth based on a result of the position determination, and a feed-forward compensation unit that adds a predetermined feed-forward control variable to a control variable of the feed-back control based on the result of the position determination; and wherein the position detection unit detects the position of the recording and reproducing head by calculating a distance from a reference position to the position of the recording and reproducing head.

7. The storage device as claimed in claim 6, wherein:
the position detection unit calculates the distance by integrating the moving speed of the actuator detected by the speed detection unit.

8. The storage device as claimed in claim 6, further comprising a position displaying unit that displays the position of the actuator,
wherein:
the position detection unit calculates the distance by using the position of the actuator displayed in the position displaying unit.

9. The storage device as claimed in claim 8, wherein:
the position displaying unit includes one of a rotary encoder mounted on the actuator and an optical scale mounted on the actuator.

10. The storage device as claimed in claim 6, wherein:
the reference position includes a position where the actuator is mechanically limited and mechanically stopped.

11. The storage device as claimed in claim 6, wherein:
the disk medium is a magnetic disk medium; and
the reference position includes a predetermined cylinder position based on servo information recorded in the magnetic disk medium.

12. The storage device as claimed in claim 11, wherein:
the predetermined cylinder position is a position of a cylinder at the periphery of the magnetic disk medium.

13. The storage device as claimed in claim 12, wherein:
the cylinder at the periphery of the magnetic disk medium is the outermost cylinder of the magnetic disk medium.

14. The storage device as claimed in claim 1, wherein:
a second predetermined position is provided;
and when the position determination unit determines that the position of the recording and reproducing head reaches the second predetermined position, the bandwidth switching unit switches the bandwidth of the feedback control to a narrow bandwidth, or the feed-forward compensation unit stops adding the predetermined feed-forward control variable to the control variable of the feed-back control.

15. The storage device as claimed in claim 14, the ramp member including:
a slope portion having a surface inclined relative to a surface of the disk medium, said slope portion raising the recording and reproducing head away from the disk medium in the operation of unloading the recording and reproducing head; and
a flat portion parallel to the surface of the disk medium and connected to the slope portion; wherein in the operation of unloading the recording and reproducing head, the second predetermined position includes a position at a boundary of the slope portion and the flat portion; and
in the operation of loading the recording and reproducing head, the second predetermined position includes a position where the recording and reproducing head is substantially out of contact with the slope portion.

16. A method of controlling movement of an actuator that supports a recording and reproducing head floating over a disk medium and recording or reproducing information in the disk medium, moves the recording and reproducing head in a radial direction of the disk medium, and loads or unloads the recording and reproducing head by using a ramp member arranged outside the disk medium, the method comprising the steps of:
detecting a moving speed of the actuator;
controlling the moving speed of the actuator by a feed-back control based on a difference between the detected moving speed and a target speed;
detecting a position of the recording and reproducing head in operations of loading or unloading the recording and reproducing head;
determining whether the detected position of the recording and reproducing head reaches a predetermined position; and
switching a bandwidth of the feedback control to a wide bandwidth or adding a predetermined feed-forward control variable to a control variable of the feed-back control based on the result of the position determination.

17. A method of controlling movement of an actuator that supports a recording and reproducing head floating over a disk medium and recording or reproducing information in the disk medium, moves the recording and reproducing head in a radial direction of the disk medium, and loads or unloads the recording and reproducing head by using a ramp member arranged outside the disk medium, the method comprising the steps of:
detecting a moving speed of the actuator;
controlling the moving speed of the actuator by a feed-back control based on a difference between the detected moving speed and a target speed;
detecting a position of the recording and reproducing head in operations of loading or unloading the recording and reproducing head;
determining whether the detected position of the recording and reproducing head reaches a predetermined position; and
switching a bandwidth of the feedback control to a wide bandwidth or adding a predetermined feed-forward control variable to a control variable of the feed-back control based on the result of the position determination;
wherein the step of switching is executed when it is determined that the detected position of the recording and reproducing head reaches the predetermined position in the step of determining.

18. A method of controlling movement of an actuator that supports a recording and reproducing head floating over a disk medium and recording or reproducing information in the disk medium, moves the recording and reproducing head in a radial direction of the disk medium, and loads or unloads the recording and reproducing head by using a ramp member arranged outside the disk medium, the method comprising the steps of:

detecting a moving speed of the actuator;
controlling the moving speed of the actuator by a feedback control based on a difference between the detected moving speed and a target speed;
detecting a position of the recording and reproducing head in operations of loading or unloading the recording and reproducing head;
determining whether the detected position of the recording and reproducing head reaches a predetermined position; and
switching a bandwidth of the feedback control to a wide bandwidth or adding a predetermined feed-forward control variable to a control variable of the feed-back control based on the result of the position determination; the method further comprising, after the step of determining and before the step of switching, a step of determining whether the speed difference exceeds a predetermined value when it is determined that the position of the recording and reproducing head reaches the predetermined position, wherein:

the step of switching is executed when it is determined that the speed difference is greater than the predetermined value.

* * * * *